(12) United States Patent
Ertas et al.

(10) Patent No.: US 12,345,201 B2
(45) Date of Patent: Jul. 1, 2025

(54) GEARBOX ASSEMBLY WITH LUBRICANT EXTRACTION VOLUME RATIO

(71) Applicants: General Electric Company, Evendale, OH (US); GE Avio S.r.l., Rivalta di Torino (IT)

(72) Inventors: Bugra H. Ertas, Niskayuna, NY (US); Xiaohua Zhang, Glenville, NY (US); Miriam Manzoni, Rivalta di Torino (IT); Flavia Turi, Bari (IT); Andrea Piazza, Turin (IT); Arthur W. Sibbach, Boxford, MA (US); Brandon W. Miller, Middletown, OH (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/990,706

(22) Filed: Dec. 20, 2024

(65) Prior Publication Data

US 2025/0122836 A1    Apr. 17, 2025

Related U.S. Application Data

(63) Continuation-in-part of application No. 18/068,017, filed on Dec. 19, 2022.

(30) Foreign Application Priority Data

Jun. 22, 2022   (IT) .................. 102022000013213

(51) Int. Cl.
*F02C 7/06*    (2006.01)
*F01D 25/20*   (2006.01)
(Continued)

(52) U.S. Cl.
CPC ............... *F02C 7/06* (2013.01); *F01D 25/20* (2013.01); *F02C 7/14* (2013.01); *F02C 7/36* (2013.01);
(Continued)

(58) Field of Classification Search
CPC ...... F02C 7/06; F02C 7/14; F02C 7/36; F01D 25/20; F16H 57/02; F16H 57/0413;
(Continued)

(56) References Cited

U.S. PATENT DOCUMENTS 9,404,420 B2   8/2016  Gallet et al.
9,790,804 B2   10/2017 Lepretre
(Continued)

FOREIGN PATENT DOCUMENTS

DE  102018101723 A1 * 7/2019  ............. B60K 6/365
DE  102019116974 A1 * 12/2020 ................ F02C 7/36
(Continued)

*Primary Examiner* — Craig Kim
(74) *Attorney, Agent, or Firm* — Venable LLP; Peter T. Hrubiec; Michele V. Frank

(57) ABSTRACT

A gearbox assembly includes a gearbox and a gutter for collecting a gearbox lubricant scavenge flow from the gearbox. The gutter is characterized by a lubricant extraction volume ratio between 0.01 and 0.3, and given by $$\frac{V_G}{V_{GB}}.$$

$V_G$ is a gutter volume of the gutter and $V_{GB}$ is a gearbox volume. A gas turbine engine includes a combustion section and the gearbox assembly. A fuel delivery system includes a fuel supply line for delivering fuel to the combustion section. A lubrication system includes a lubricant supply line for delivering lubricant to the gearbox assembly. A thermal (Continued)

management system includes a fuel-lubricant heat exchanger for cooling the lubricant with the fuel. The thermal management system selectively directs the fuel through fuel bypass lines or the lubricant through lubricant bypass lines to bypass the fuel-lubricant heat exchanger based on a fuel temperature or a lubricant temperature.

20 Claims, 7 Drawing Sheets

(51) Int. Cl.
    *F02C 7/14*     (2006.01)
    *F02C 7/36*     (2006.01)
    *F16H 57/02*     (2012.01)
    *F16H 57/04*     (2010.01)

(52) U.S. Cl.
    CPC ......... *F16H 57/02* (2013.01); *F16H 57/0413* (2013.01); *F16H 57/0415* (2013.01); *F16H 57/0423* (2013.01); *F16H 57/0436* (2013.01); *F16H 57/045* (2013.01); *F05D 2260/213* (2013.01); *F05D 2260/4031* (2013.01); *F05D 2260/98* (2013.01); *F16H 2057/02039* (2013.01)

(58) Field of Classification Search
    CPC ............. F16H 57/0415; F16H 57/0423; F16H 57/0435; F16H 57/0436; F16H 57/045; F16H 2057/02039; F05D 2260/213; F05D 2260/4031; F05D 2260/98
    See application file for complete search history.

(56) References Cited

U.S. PATENT DOCUMENTS

| | | | |
|---|---|---|---|
| 10,082,105 B2 | 9/2018 | McCune et al. | |
| 10,247,020 B2 | 4/2019 | McCune | |
| 10,287,915 B2 | 5/2019 | McCune | |
| 10,364,881 B2 | 7/2019 | Pikovsky et al. | |
| 10,605,351 B2 | 3/2020 | Sheridan et al. | |
| 11,060,417 B2 | 7/2021 | McCune | |
| 11,066,945 B2 | 7/2021 | McCune | |
| 11,203,974 B2 | 12/2021 | Sheridan | |
| 11,236,637 B2 | 2/2022 | Parnin et al. | |
| 11,268,453 B1 | 3/2022 | Desjardins et al. | |
| 11,339,725 B2 | 5/2022 | Simon et al. | |
| 11,719,127 B2 | 8/2023 | Davis et al. | |
| 11,725,589 B2 * | 8/2023 | Sheridan | F02C 7/06 416/174 |
| 12,044,305 B2 * | 7/2024 | Jacquemard | F01D 25/18 |
| 12,214,369 B2 * | 2/2025 | Robert | B05B 16/60 |
| 2008/0116010 A1 * | 5/2008 | Portlock | F01D 25/18 184/6.12 |
| 2013/0319006 A1 | 12/2013 | Parnin et al. | |
| 2015/0089918 A1 | 4/2015 | Valva et al. | |
| 2015/0267618 A1 | 9/2015 | Schwarz et al. | |
| 2015/0361810 A1 * | 12/2015 | Mccune | F01D 9/065 60/39.08 |
| 2016/0032773 A1 | 2/2016 | James et al. | |
| 2017/0051823 A1 | 2/2017 | Pikovsky et al. | |
| 2017/0108110 A1 | 4/2017 | Sheridan | |
| 2019/0113127 A1 | 4/2019 | Gravina | |
| 2019/0170004 A1 * | 6/2019 | McCune | F01D 25/18 |
| 2019/0271236 A1 | 9/2019 | McCune | |
| 2019/0323597 A1 * | 10/2019 | Sheridan | F01D 19/00 |
| 2019/0360578 A1 * | 11/2019 | Chevillot | F16H 57/0456 |
| 2020/0165980 A1 | 5/2020 | Di Giovanni | |
| 2020/0200042 A1 | 6/2020 | Charrier et al. | |
| 2021/0017910 A1 | 1/2021 | Spruce | |
| 2021/0148453 A1 | 5/2021 | Pennacino et al. | |
| 2021/0222767 A1 | 7/2021 | Jabido et al. | |
| 2021/0324762 A1 | 10/2021 | Anglin et al. | |
| 2022/0316584 A1 * | 10/2022 | Jacquemard | F16N 39/002 |
| 2022/0397040 A1 | 12/2022 | Molesini et al. | |
| 2022/0403783 A1 | 12/2022 | Miller et al. | |
| 2023/0021913 A1 | 1/2023 | Levisse et al. | |
| 2023/0417185 A1 * | 12/2023 | Ertas | F16H 57/0486 |
| 2024/0426487 A1 * | 12/2024 | Pfister | F24F 1/16 |
| 2025/0043720 A1 * | 2/2025 | Schimmels | F02C 7/045 |

FOREIGN PATENT DOCUMENTS

| | | | |
|---|---|---|---|
| EP | 2148114 A1 | 1/2010 | |
| EP | 2980368 A1 | 2/2016 | |
| EP | 2855859 B1 | 1/2019 | |
| FR | 3127024 A1 | 3/2023 | |
| FR | 3127025 A1 | 3/2023 | |
| FR | 3129436 A1 | 5/2023 | |
| FR | 3129690 A1 | 6/2023 | |
| FR | 3130747 A1 | 6/2023 | |
| FR | 3130875 A1 | 6/2023 | |
| WO | WO-2015147948 A2 * | 10/2015 | F01D 25/20 |
| WO | WO-2015147949 A2 * | 10/2015 | F01D 25/20 |
| WO | WO-2020245529 A1 * | 12/2020 | F01D 15/12 |
| WO | WO-2021229167 A1 * | 11/2021 | F01D 1/24 |

* cited by examiner

GEARBOX ASSEMBLY WITH LUBRICANT EXTRACTION VOLUME RATIO

CROSS REFERENCE TO RELATED APPLICATIONS

The present application is a continuation-in-part application of U.S. patent application Ser. No. 18/068,017, filed Dec. 19, 2022, which claims the benefit of Italian Patent Application No. 102022000013213, filed on Jun. 22, 2022, the entire contents of which are incorporated by reference in their entireties.

TECHNICAL FIELD

The present disclosure relates to a gearbox assembly for an engine, for example, a gas turbine engine for an aircraft.

BACKGROUND

Lubricant is used in a power gearbox to lubricate gears and rotating parts in the gearbox. Lubricant may be supplied to lubricate the mesh between the gears. As the gears of the gearbox assembly rotate during operation, the lubricant is expelled outwardly. The lubricant is captured by a gutter.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
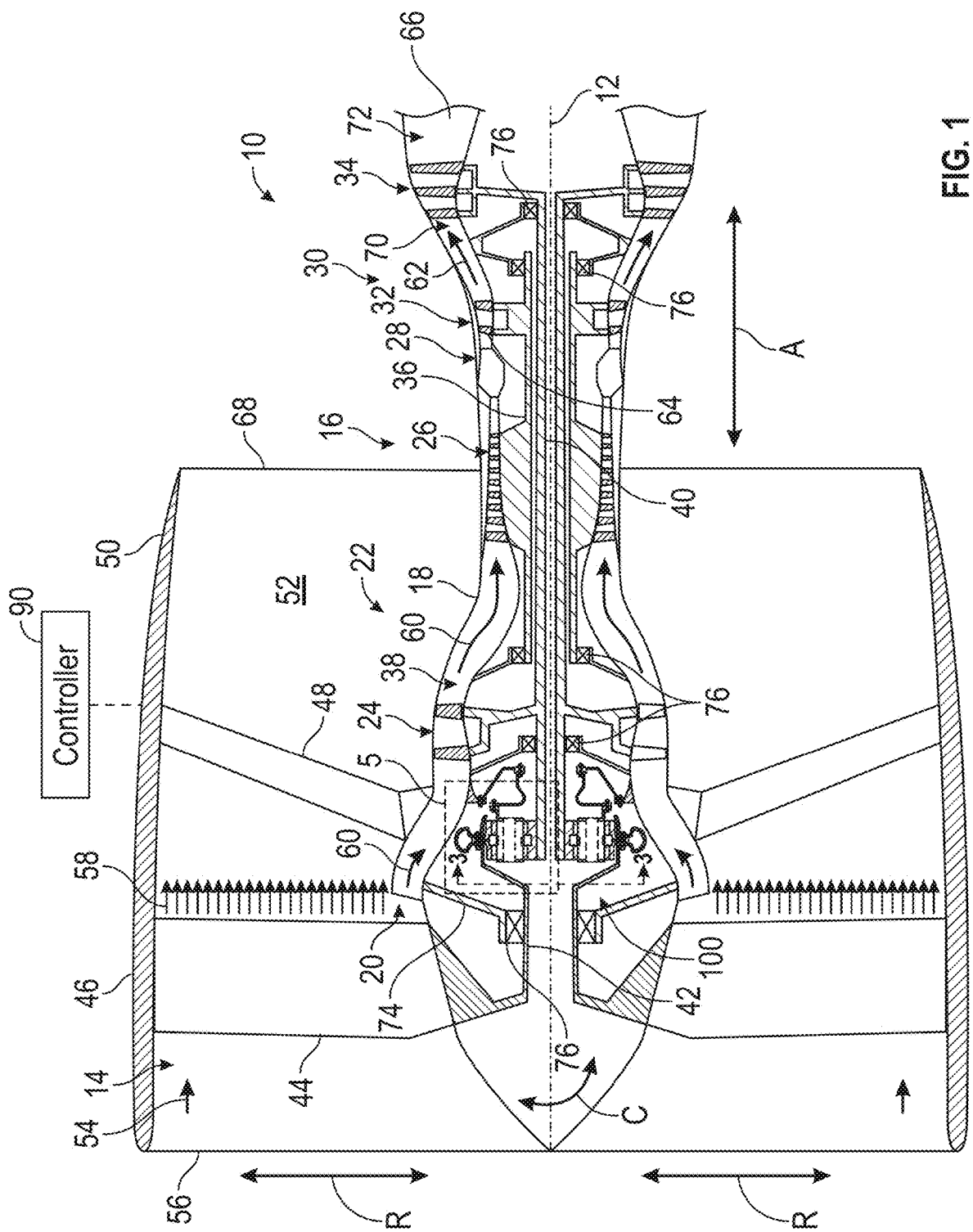
FIG. 1 illustrates a schematic, cross-sectional view of an engine, taken along a longitudinal centerline axis of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft.

In either configuration, it is desired to increase efficiency. There are several effects that can negatively impact a gearbox's efficiency. For example, gearboxes experience windage across rotating components (e.g., in the bearing, in rolling surfaces, in the gears), that is, shear and drag forces are generated across the gears, pins, and bearings of the gearboxes. In another example, the rotating components of the gearbox experience friction losses due to the relative rotation between components. The windage and friction losses reduce the efficiency of the gearbox. In addition to reducing efficiency, windage and friction losses contribute to heat generation in gearboxes. The relative rotating surfaces and force transmission between the gears also generates heat in the gearboxes.

When a gearbox operates at higher efficiency a greater percentage of the input power from the LP shaft is transferred to the fan shaft. To improve gearbox efficiency, lubrication is provided to the gearboxes to provide a protective film at the rolling contact surfaces, to lubricate the components, and to remove heat from the gearbox. Lubrication supplied to the gearbox, however, needs to be removed from the gearbox. Buildup of lubrication in the gearbox may reduce efficiency and may not remove the heat from the gearbox. Furthermore, allowing the lubrication in the gearbox to enter other components of the engine may negatively impact operation of the other components. One way to remove lubrication from the gearbox is to scavenge the lubrication through a gutter. The gutter collects lubricant expelled from the gearbox during operation. Gutters are often designed to circumscribe the ring gear, without taking into account the requirements of the engine or the gearbox. This results in gutters that are too large or too small. A gutter that is larger than required for the engine takes up valuable space in the engine, adding weight to the engine and decreasing overall engine efficiency. A gutter that is smaller than required for the engine may not properly scavenge the lubricant from the gearbox, allowing leakage from the gutter and reducing the ability of the lubricant to remove heat from the gearbox. The inventors, seeking ways to improve upon existing gutters in terms of their size/capacity for particular architectures, gearbox types or mission requirements, tested different gutter configurations to ascertain what factors play into an appropriate gutter sizing.

FIG. 1 illustrates a schematic, cross-sectional view of an engine, also referred to as a gas turbine engine 10. The gas turbine engine 10 defines an axial direction A extending parallel to a longitudinal, engine centerline, also referred to as a longitudinal centerline axis 12, a radial direction R that is normal to the axial direction A, and a circumferential direction C about the longitudinal centerline axis 12 (shown in/out of the page in FIG. 1). The gas turbine engine 10 includes a fan section 14 and a core engine, also referred to as a turbo-engine 16, downstream from the fan section 14.

The turbo-engine 16 includes a core engine casing 18 that is substantially tubular and defines an annular inlet 20. The core engine casing 18 encases, and the turbo-engine 16 includes, in serial flow relationship, a compressor section 22 including a low-pressure (LP) compressor 24, also referred to as a booster, followed downstream by a high-pressure (HP) compressor 26, a combustion section 28, a turbine section 30 including a high-pressure (HP) turbine 32 followed downstream by a low-pressure (LP) turbine 34, and a jet exhaust nozzle section 72 downstream of the low-pressure turbine 34. A high-pressure (HP) shaft 36 drivingly connects the high-pressure turbine 32 to the high-pressure compressor 26 to rotate the high-pressure turbine 32 and the high-pressure compressor 26 in unison. The compressor section 22, the combustion section 28, and the turbine section 30 together define a core air flowpath 38 extending from the annular inlet 20 to the jet exhaust nozzle section 72.

A low-pressure (LP) shaft 40 drivingly connects the low-pressure turbine 34 to the low-pressure compressor 24 to rotate the low-pressure turbine 34 and the low-pressure compressor 24 in unison. A gearbox assembly 100 couples the low-pressure shaft 40 to a fan shaft 42 to drive the fan blades 44 of the fan section 14. The fan shaft 42 is coupled to a fan frame 74 via one or more engine bearings 76. The one or more engine bearings 76 support rotation of the fan shaft 42. The one or more engine bearings 76 also include engine bearings 76 that support rotation of the high-pressure shaft 36 and engine bearings 76 that support rotation of the low-pressure shaft 40.

The fan blades 44 extend radially outward from the longitudinal centerline axis 12 in the direction R. The fan blades 44 rotate about the longitudinal centerline axis 12 via the fan shaft 42 that is powered by the low-pressure shaft 40 across the gearbox assembly 100. The gearbox assembly 100 adjusts the rotational speed of the fan shaft 42 and, thus, the fan blades 44 relative to the low-pressure shaft 40. That is, the gearbox assembly 100 is a reduction gearbox and power gearbox that delivers a torque from the low-pressure shaft 40 running at a first speed, to the fan shaft 42 coupled to fan blades 44 running at a second, slower speed.

In FIG. 1, the fan section 14 includes an annular fan casing or a nacelle 46 that circumferentially surrounds the fan blades 44 or at least a portion of the turbo-engine 16. The nacelle 46 is supported relative to the turbo-engine 16 by a plurality of circumferentially spaced outlet guide vanes 48. Moreover, an aft section 50 of the nacelle 46 extends circumferentially around a portion of the outer casing (e.g., the core engine casing 18) of the turbo-engine 16 to define a bypass airflow passage 52 therebetween.

During operation of the gas turbine engine 10, a volume of air, represented by airflow 54, enters the gas turbine engine 10 through an inlet 56 of the nacelle 46 or the fan section 14. As airflow 54 passes across the fan blades 44, a first portion of the airflow 54, represented by bypass airflow 58, is directed or is routed into the bypass airflow passage 52, and a second portion of the airflow 54, represented by core airflow 60, is directed or is routed into an upstream section of the core air flowpath 38 via the annular inlet 20. The ratio between the bypass airflow 58 and the core airflow 60 defines a bypass ratio. The pressure of the core airflow 60 is increased as the core airflow 60 is routed through the high-pressure compressor 26 and into the combustion section 28, where the now highly pressurized core airflow 60 is mixed with fuel and burned to provide combustion products or combustion gases, represented by flow 62.

The combustion gases, via flow 62, are routed into the high-pressure turbine 32 and expanded through the high-pressure turbine 32 where a portion of thermal energy or of kinetic energy from the combustion gases is extracted via sequential stages of high-pressure turbine stator vanes that are coupled to the core engine casing 18 and high-pressure turbine rotor blades 64 that are coupled to the high-pressure shaft 36, thus, causing the high-pressure shaft 36 to rotate, thereby supporting operation of the high-pressure compressor 26. The combustion gases, via flow 62, are then routed into the low-pressure turbine 34 and expanded through the low-pressure turbine 34. Here, a second portion of thermal and kinetic energy is extracted from the combustion gases via sequential stages of the low-pressure turbine stator vanes that are coupled to the core engine casing 18 and low-pressure turbine rotor blades 66 that are coupled to the low-pressure shaft 40, thus, causing the low-pressure shaft 40 to rotate. This thereby supports operation of the low-pressure compressor 24 and rotation of the fan blades 44 via the gearbox assembly 100.

The combustion gases, via flow 62, are subsequently routed through the jet exhaust nozzle section 72 downstream of the low-pressure turbine 34 to provide propulsive thrust. The high-pressure turbine 32, the low-pressure turbine 34, and the jet exhaust nozzle section 72 at least partially define a hot gas path 70 for routing the combustion gases, via flow 62, through the turbo-engine 16. Simultaneously, the pressure of the bypass airflow 58 is increased as the bypass airflow 58 is routed through the bypass airflow passage 52 before being exhausted from a fan nozzle exhaust section 68 of the gas turbine engine 10, also providing propulsive thrust.

The gas turbine engine 10 includes a controller 90 for controlling aspects of the gas turbine engine 10. For example, the controller 90 is in two-way communication with the gas turbine engine 10 for receiving signals from various sensors and control systems of the gas turbine engine 10 and for controlling components of the gas turbine engine 10, as detailed further below. The controller 90, or components thereof, may be located onboard the gas turbine engine 10, onboard the aircraft, or can be located remote from each of the gas turbine engine 10 and the aircraft. The controller 90 can be a Full Authority Digital Engine Control (FADEC) that controls aspects of the gas turbine engine 10.

The controller 90 may be a standalone controller or may be part of an engine controller to operate various systems of the gas turbine engine 10. In this embodiment, the controller 90 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 90 to perform operations. The controller 90 and, more specifically, the one or more processors are programmed or configured to perform these operations, such as the operations discussed further below. In some embodiments, the instructions can be executed by the one or more processors to cause the one or more processors to complete any of the operations and functions for which the controller 90 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The gas turbine engine 10 depicted in FIG. 1 is by way of example only. In other exemplary embodiments, the gas turbine engine 10 may have any other suitable configuration. For example, in other exemplary embodiments, the fan section 14 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, or turboshaft engines.

Figure 2:
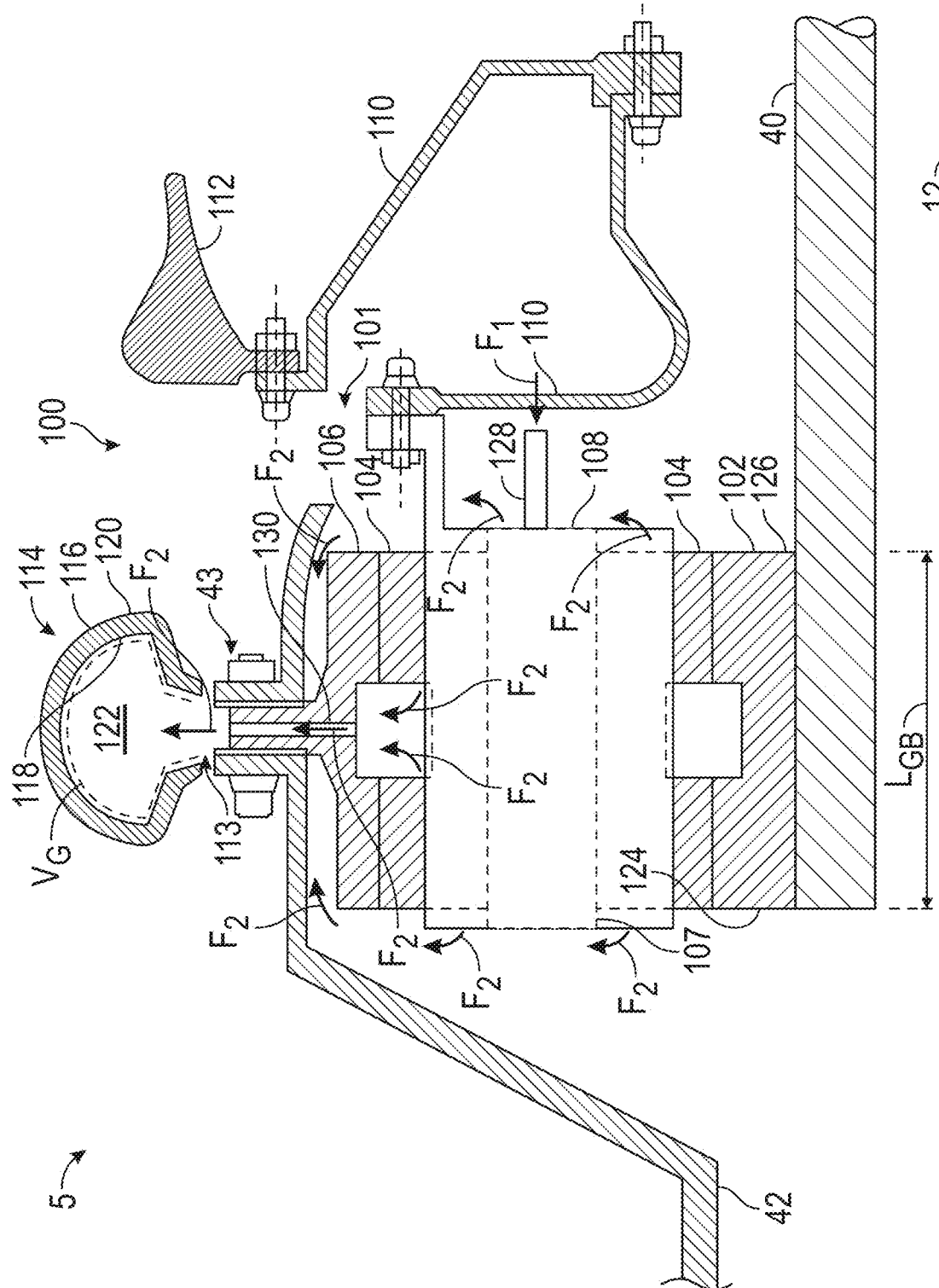
FIG. 2 illustrates a schematic, detail view of the gearbox assembly of the engine of FIG. 1, according to an embodiment of the present disclosure.
Figure 3:
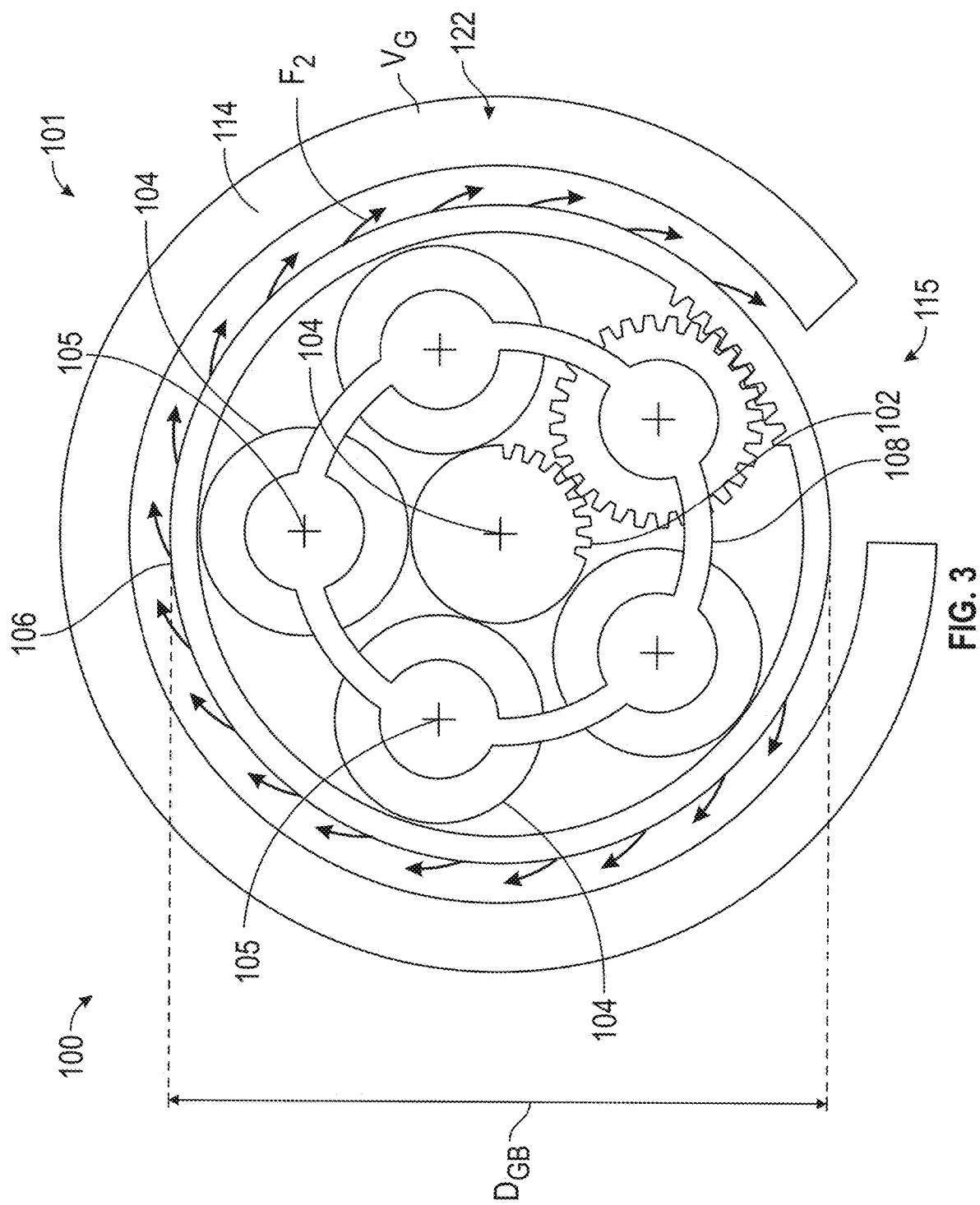
FIG. 3 illustrates a schematic, end view of the gearbox assembly of FIG. 2, taken along line 3-3 of FIG. 1, with the fan shaft omitted for clarity, according to an embodiment of the present disclosure.

FIG. 2 illustrates a detail view 5 of FIG. 1 of the gearbox assembly 100. FIG. 3 illustrates a schematic axial end view, taken along the line 3-3 of FIG. 1, of the gears of the gearbox assembly 100. The fan shaft 42 and a coupling 43 are omitted from FIG. 3 for clarity. Referring to FIGS. 2 and 3, the gearbox assembly 100 includes a gearbox 101 and a gutter 114. The gearbox 101 includes a sun gear 102, a plurality of planet gears 104, and a ring gear 106. The low-pressure turbine 34 (FIG. 1) drives the low-pressure shaft 40, which is coupled to the sun gear 102 of the gearbox assembly 100. The gearbox assembly 100 in turn drives the fan shaft 42.

Referring to FIG. 2, the low-pressure shaft 40 causes the sun gear 102 to rotate about the longitudinal centerline axis 12. Radially outwardly of the sun gear 102, and intermeshing therewith, is the plurality of planet gears 104 that are coupled together by a planet carrier 108. The planet carrier 108 is coupled, via a flex mount 110, to an engine frame 112. The planet carrier 108 constrains the plurality of planet gears 104 while allowing each planet gear of the plurality of planet gears 104 to rotate about a respective planet gear axis 105 (FIG. 3) on a pin 107. Radially outwardly of the plurality of planet gears 104, and intermeshing therewith, is the ring gear 106, which is an annular ring gear. The ring gear 106 is coupled to the fan shaft 42 at a coupling 43. The ring gear 106 is coupled via the fan shaft 42 to the fan blades 44 (FIG. 1) in order to drive rotation of the fan blades 44 about the longitudinal centerline axis 12. The gutter 114 includes a gutter wall 116 having an inner surface 118 and an outer surface 120. A gutter volume $V_G$ is defined within an interior 122 of the gutter wall 116. The gutter volume $V_G$ is illustrated by the dashed line in FIG. 2 for illustration purposes, the volume $V_G$ extends all the way to the inner surface 118 of the gutter 114. Although the gutter 114 is depicted with a relatively bell-like shape or tear-drop shape, any shape suitable to collecting lubricant is contemplated.

Although not depicted in FIG. 2, and shown only partially in FIG. 3 for clarity, each of the sun gear 102, the plurality of planet gears 104, and the ring gear 106 comprises teeth about their periphery to intermesh with teeth of the adjacent gears. The gearbox 101 has a gearbox diameter $D_{GB}$ defined by an outer diameter of the gearbox 101. The outer diameter of the gearbox 101 may be the outer diameter of the ring gear 106 such that the gearbox diameter $D_{GB}$ is defined by the outer diameter of the ring gear 106. Referring to FIG. 2, the sun gear 102, the plurality of planet gears 104, and the ring gear 106 are axially aligned such that a forwardmost end 124 of the gears is coplanar and an aftmost end 126 of the gears is coplanar. The gearbox 101 has an axial gearbox length $L_{GB}$ defined from the forwardmost end 124 of the gears to the aftmost end 126 of the gears.

Referring to FIG. 3, the gutter 114 may be circular and may wholly or partially circumscribe the gears of the gearbox assembly 100. For example, the gutter 114 may wholly or partially circumscribe the ring gear 106. Therefore, the gutter 114 is located radially outward of the sun gear 102, the plurality of planet gears 104, and the ring gear 106. The gutter 114 does not rotate with the gears of the gearbox assembly 100.

The gutter 114 includes a scavenge port 115 located at or near the bottom of the gutter 114. The scavenge port 115 allows lubricant collected by the gutter 114 to be removed from the gearbox assembly 100. Although shown as a large opening in the gutter 114, the scavenge port 115 may be any size or shape aperture or port that allows a flow of fluid from the interior 122 of the gutter 114 to a passage or reservoir (not depicted) outside of the gearbox assembly 100. By locating the scavenge port 115 at or near the bottom portion of the gutter 114, gravity may assist in causing the lubricant to flow toward the scavenge port 115 and, thus, may promote removal of the lubricant from the gearbox assembly 100. Once removed from the gutter 114, the lubricant may be recirculated through a lubricant channel 128 (FIG. 2) or collected elsewhere for disposal or removal.

The gearbox assembly 100 of FIGS. 2 and 3 is a star configuration gearbox assembly, in that the planet carrier 108 is held fixed (e.g., via the flex mount 110 to the engine frame 112) and the ring gear 106 is permitted to rotate. That is, the fan section 14 is driven by the ring gear 106. However, other suitable types of gearbox assembly 100 may be employed. In one non-limiting example, the gearbox assembly 100 may be a planetary configuration, in that the planet carrier 108 is coupled to the fan shaft 42 (FIG. 1) via an output shaft to rotate the fan shaft 42, with the ring gear 106 being held stationary or fixed. In this example, the fan section 14 (FIG. 1) is driven by the planet carrier 108. In another non-limiting example, the gearbox assembly 100 may be a differential gearbox in which the ring gear 106 and the planet carrier 108 are both allowed to rotate.

During engine operation, and referring to FIGS. 2 and 3, gears of the gearbox assembly 100 rotate as previously described. A lubricant (e.g., oil) is provided to lubricate the rotating parts of the gearbox assembly 100, including the sun gear 102, the plurality of planet gears 104, the ring gear 106, and the pins 107. A lubrication system (e.g., one of the lubrication systems shown in FIGS. 4 to 7) supplies a flow $F_1$, also referred to as a first lubricant flow $F_1$, of the lubricant through the lubricant channel 128 to supply lubricant to the gearbox assembly 100. As the gears of the gearbox assembly 100 rotate, centrifugal forces expel the lubricant radially outward, away from the longitudinal centerline axis 12, as shown by flow $F_2$, also referred to as a second lubricant flow $F_2$, or a gearbox scavenge flow $F_2$. The flow $F_2$ flows around the ring gear 106 or through a ring gear passage 130 to be collected by the gutter 114. The lubricant flows into a gutter inlet 113. In this manner, lubricant supplied through the lubricant channel 128 is collected in the gutter 114 after flowing through and around the gears and other rotating parts of the gearbox assembly 100.

Figure 4:
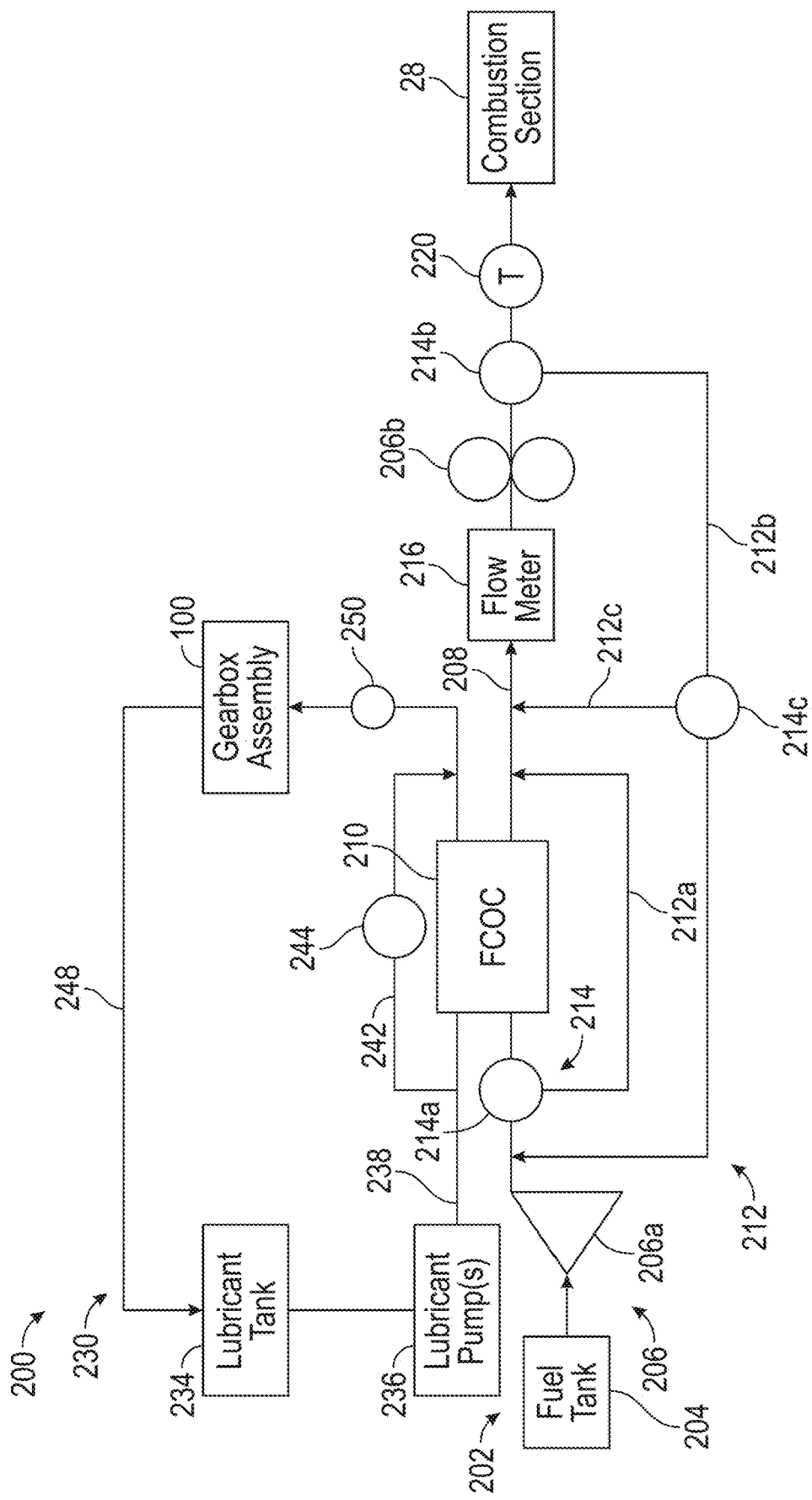
FIG. 4 is a schematic diagram of a thermal management system for the gas turbine engine of FIG. 1, according to an embodiment of the present disclosure.

FIG. 4 is a schematic diagram of a thermal management system 200 for the gas turbine engine 10, according to an embodiment of the present disclosure. The gas turbine engine 10 also includes a fuel delivery system 202 and a lubrication system 230. The fuel delivery system 202 includes a fuel tank 204, one or more fuel pumps 206, and a fuel supply line 208. The fuel tank 204 stores fuel therein, such as a liquid fuel or a gaseous fuel. For example, the fuel can include a kerosene-based jet fuel, such as, for example, Jet A, Jet A-1, jet propellant 5 (JP-5), or jet propellant 8 (JP-8), or a gaseous fuel, such as, for example, a hydrogen fuel, or the like. The fuel can include any type of aviation fuel used to power turbine engines for aircraft.

The one or more fuel pumps 206 can have any suitable configuration. For example, the one or more fuel pumps 206 can be powered by an electrical input, can be powered by a shaft (e.g., the LP shaft 40 or the HP shaft 36) of the turbo-engine 16, can be a turbopump (e.g., comprising a turbine and a pump), etc. The one or more fuel pumps 206 are in fluid communication with the fuel tank 204 and pump, or drive, the fuel from the fuel tank 204 along the fuel supply line 208. The fuel supply line 208 is in fluid communication with the fuel pumps 206 and the combustion section 28. The fuel flows through the fuel supply line 208 and the fuel supply line 208 directs the fuel to the combustion section 28. In this way, the fuel delivery system 202 supplies the fuel to the combustion section 28 and the combustion section 28 combusts the fuel and air to produce the combustion gases (e.g., the flow 62 in FIG. 1), as detailed above.

The one or more fuel pumps 206 include a first fuel pump 206a and a second fuel pump 206b. The first fuel pump 206a is a boost stage that includes a low-pressure centrifugal pump that initially increases a pressure of the fuel from the fuel tank 204 to an initial pressure to initiate a flow of the fuel through fuel supply line 208. The second fuel pump 206b is a gear stage that includes a high-pressure positive displacement gear pump that further increases the pressure of the fuel to a final pressure that is required by the combustion section 28 for delivering the fuel to the combustion section 28. The final pressure is greater than the initial pressure. While two fuel pumps are detailed herein, the fuel delivery system 202 can include any number of fuel pumps 206 for increasing the pressure of the fuel from the fuel tank 204 to the combustion section 28.

The thermal management system 200 includes a fuel cooled oil cooler (FCOC), also referred to as a fuel-lubricant heat exchanger 210, one or more fuel bypass lines 212, and one or more fuel bypass valves 214. The fuel-lubricant heat exchanger 210 is a heat exchanger for cooling the lubricant that is delivered to the gearbox assembly 100, as detailed further below. The fuel-lubricant heat exchanger 210 is in fluid communication with the fuel supply line 208 and is positioned downstream of the fuel tank 204 and upstream of the combustion section 28. In FIG. 4, the fuel-lubricant heat exchanger 210 is positioned downstream of the first fuel pump 206a and upstream of the second fuel pump 206b. However, the fuel-lubricant heat exchanger 210 can be positioned anywhere along the fuel supply line 208 downstream of the fuel tank 204 and upstream of the combustion section 28 for cooling the lubricant.

The one or more fuel bypass lines 212 include bypass lines in fluid communication with the fuel supply line 208 for bypassing the fuel around at least one of the fuel-lubricant heat exchanger 210 or the combustion section 28 to control a fuel temperature of the fuel, as detailed further below. In particular, the one or more fuel bypass lines 212 include a first fuel bypass line 212a, a second fuel bypass line 212b, and a third fuel bypass line 212c. The first fuel bypass line 212a is in fluid communication with the fuel supply line 208. The first fuel bypass line 212a includes an inlet that is upstream of the fuel-lubricant heat exchanger 210 and an outlet that is downstream of the fuel-lubricant heat exchanger 210. In this way, the first fuel bypass line 212a directs the fuel to bypass the fuel-lubricant heat exchanger 210. The second fuel bypass line 212b is in fluid communication with the fuel supply line 208. The second fuel bypass line 212b includes an inlet that is downstream of the fuel-lubricant heat exchanger 210 and upstream of the combustion section 28 and an outlet that is upstream of the fuel-lubricant heat exchanger 210. In this way, the second fuel bypass line 212b directs the fuel to bypass the combustion section 28 to upstream of the fuel-lubricant heat exchanger 210. The third fuel bypass line 212c is in fluid communication with the second fuel bypass line 212b and the fuel supply line 208. The third fuel bypass line 212c includes an inlet at the second fuel bypass line 212b that is downstream of the inlet of the second fuel bypass line 212b and upstream of the outlet of the second fuel bypass line 212b and an outlet at the fuel supply line 208 that is downstream of the fuel-lubricant heat exchanger 210 and upstream of the inlet of the second fuel bypass line 212b. In this way, the third fuel bypass line 212c directs the fuel from the second fuel bypass line 212b to the fuel supply line 208 to bypass the fuel-lubricant heat exchanger 210.

The one or more fuel bypass valves 214 are in fluid communication with the one or more fuel bypass lines 212 for selectively directing the fuel into the fuel bypass lines 212, as detailed further below. The one or more fuel bypass valves 214 can include on/off valves or proportional valves for controlling the fuel through the fuel supply line 208 and the fuel bypass lines 212. The fuel bypass valves 214 are three-way valves that include an inlet and two outlets. The fuel bypass valves 214 include a first fuel bypass valve 214a, a second fuel bypass valve 214b, and a third fuel bypass valve 214c.

The first fuel bypass valve 214a is in fluid communication with the fuel supply line 208 and the first fuel bypass line 212a. In particular, the inlet of the first fuel bypass valve 214a is fluidly coupled with the fuel supply line 208, a first outlet of the first fuel bypass valve 214a is fluidly coupled with the fuel supply line 208, and a second outlet of the first fuel bypass valve 214a is fluidly coupled with the first fuel bypass line 212a. In this way, the first fuel bypass valve 214a can be controlled (e.g., by the controller 90) to selectively direct the fuel through the fuel supply line 208 or through the first fuel bypass line 212a, as detailed further below.

The second fuel bypass valve 214b is in fluid communication with the fuel supply line 208 and the second fuel bypass line 212b. In particular, the inlet of the second fuel bypass valve 214b is fluidly coupled with the fuel supply line 208, a first outlet of the second fuel bypass valve 214b is fluidly coupled with the fuel supply line 208, and a second outlet of the second fuel bypass valve 214b is fluidly coupled with the second fuel bypass line 212b. In this way, the second fuel bypass valve 214b can be controlled (e.g., by the controller 90) to selectively direct the fuel through the fuel supply line 208 or through the second fuel bypass line 212b, as detailed further below.

The third fuel bypass valve 214c is in fluid communication with the second fuel bypass line 212b and the third fuel bypass line 212c. In particular, the inlet of the third fuel bypass valve 214c is fluidly coupled with the second fuel bypass line 212b, a first outlet of the third fuel bypass valve 214c is fluidly coupled with the second fuel bypass line 212b, and a second outlet of the third fuel bypass valve 214c is fluidly coupled with the third fuel bypass line 212c. In this way, the third fuel bypass valve 214c can be controlled (e.g., by the controller 90) to selectively direct the fuel through the second fuel bypass line 212b or through the third fuel bypass line 212c, as detailed further below.

The fuel delivery system 202 also includes a fuel flow meter 216 in fluid communication with the fuel supply line 208. In particular, the fuel flow meter 216 is positioned downstream of the fuel-lubricant heat exchanger 210. The fuel flow meter 216 is a sensor that measures the flow rate of the fuel in the fuel supply line 208 to the combustion section 28. The controller 90 receives the flow of the fuel from the fuel flow meter 216 and controls the fuel pumps 206 or controls a metering valve to control the flow rate of the fuel in the fuel delivery system 202.

The thermal management system 200 also includes one or more fuel sensors 220 for sensing data indicative of one or more parameters of the fuel in the fuel delivery system 202. For example, the fuel sensors 220 can include temperature sensors, pressure sensors, or flow rate sensors. In FIG. 4, the fuel sensors 220 include temperature sensors for sensing data indicative of a temperature of the fuel in the fuel delivery system 202. In particular, the fuel sensors 220 are positioned in the fuel supply line 208 downstream of the fuel bypass lines 212 (e.g., downstream of the second fuel bypass line 212b) and upstream of the combustion section 28. In this way, the fuel sensors 220 sense the data indicative of the temperature of the fuel prior to the fuel being delivered to the combustion section 28.

As shown in FIG. 4, the lubrication system 230 includes a lubricant tank 234, one or more lubricant pumps 236, and a lubricant supply line 238. The lubricant tank 234 stores a lubricant therein. For example, the lubricant can include oil, or the like.

The one or more lubricant pumps 236 can have any suitable configuration. For example, the one or more lubricant pumps 236 can be powered by an electrical input, can be powered by a shaft (e.g., the LP shaft 40 or the HP shaft 36) of the turbo-engine 16, can be a turbopump (e.g., comprising a turbine and a pump), etc. The one or more lubricant pumps 236 are in fluid communication with the lubricant tank 234 and pump, or drive, the lubricant from the lubricant tank 234 along the lubricant supply line 238. The lubricant supply line 238 is in fluid communication with the lubricant pumps 236 and the gearbox assembly 100. The lubricant flows through the lubricant supply line 238 and the lubricant supply line 238 directs the lubricant to the gearbox assembly 100. In this way, the lubrication system 230 supplies the lubricant to the gearbox assembly 100 to lubricate the gears of the gearbox assembly 100.

The thermal management system 200 includes one or more lubricant bypass lines 242, and one or more lubricant bypass valves 244. The fuel-lubricant heat exchanger 210 is in fluid communication with the lubricant supply line 238 and is positioned downstream of the lubricant tank 234 and upstream of the gearbox assembly 100. In FIG. 4, the fuel-lubricant heat exchanger 210 is positioned downstream of the lubricant pump 236. However, the fuel-lubricant heat exchanger 210 can be positioned anywhere along the lubricant supply line 238 downstream of the lubricant tank 234 and upstream of the gearbox assembly 100 for cooling the lubricant.

The one or more lubricant bypass lines 242 include bypass lines in fluid communication with the lubricant supply line 238 for bypassing the lubricant around the fuel-lubricant heat exchanger 210 to control a lubricant temperature of the lubricant, as detailed further below. The lubricant bypass lines 242 are in fluid communication with the lubricant supply line 238. In particular, the lubricant bypass lines 242 include an inlet that is upstream of the fuel-lubricant heat exchanger 210 and an outlet that is downstream of the fuel-lubricant heat exchanger 210. In this way, the lubricant bypass lines 242 direct the lubricant to bypass the fuel-lubricant heat exchanger 210 from upstream of the fuel-lubricant heat exchanger 210 to downstream of the fuel-lubricant heat exchanger 210.

The one or more lubricant bypass valves 244 are in fluid communication with the one or more lubricant bypass lines 242 for selectively directing the lubricant into the lubricant bypass lines 242, as detailed further below. The one or more lubricant bypass valves 244 can include on/off valves or proportional valves for controlling the lubricant through the lubricant supply line 238 and the lubricant bypass lines 242. The lubricant bypass valves 244 are three-way valves that include an inlet and two outlets.

The lubricant bypass valves 244 are in fluid communication with the lubricant supply line 238 and the lubricant bypass lines 242. In particular, the inlet of the lubricant bypass valves 244 is fluidly coupled with the lubricant supply line 238, a first outlet of the lubricant bypass valves 244 is fluidly coupled with the lubricant supply line 238, and a second outlet of the lubricant bypass valves 244 is fluidly coupled with the lubricant bypass lines 242. In this way, the lubricant bypass valves 244 can be controlled (e.g., by the controller 90) to selectively direct the lubricant through the lubricant supply line 238 or through the lubricant bypass lines 242, as detailed further below.

The lubrication system 230 also includes a lubricant return line 248 in fluid communication with the gearbox assembly 100 and the lubricant tank 234. The lubricant return line 248 directs the lubricant that drains from the gearbox assembly 100 back to the lubricant tank 234. In this way, the lubricant can be recirculated through the lubrication system 230.

The thermal management system 200 also includes one or more lubricant sensors 250 for sensing data indicative of one or more parameters of the lubricant in the lubrication system 230. For example, the lubricant sensors 250 can include temperature sensors, pressure sensors, or flow rate sensors. In FIG. 4, the lubricant sensors 250 include temperature sensors for sensing data indicative of a temperature of the lubricant in the lubrication system 230. In particular, the lubricant sensors 250 are positioned in the lubricant supply line 238 downstream of the lubricant bypass lines 242 and upstream of the gearbox assembly 100. In this way, the lubricant sensors 250 sense the data indicative of the temperature of the lubricant prior to the lubricant being delivered to the gearbox assembly 100.

In operation, the one or more fuel pumps 206 pump the fuel from the fuel tank 204 to the combustion section 28 through the fuel supply line 208. At the same time, the one or more lubricant pumps 236 pump the lubricant from the lubricant tank 234 to the gearbox assembly 100 through the lubricant supply line 238. The fuel and the lubricant flow through the fuel-lubricant heat exchanger 210. In this way, the fuel and the lubricant are in thermal communication with each other in the fuel-lubricant heat exchanger 210. In particular, the fuel absorbs heat from the lubricant in the fuel-lubricant heat exchanger 210 such that the heat from the lubricant is transferred to the fuel. In this way, the fuel-lubricant heat exchanger 210 heats the fuel and cools the lubricant as the fuel and the lubricant flow through the fuel-lubricant heat exchanger 210.

During operation, the controller 90 (FIG. 1) controls the one or more fuel bypass valves 214 and the one or more lubricant bypass valves 244 to control the fuel temperature of the fuel and the lubricant temperature of the lubricant. In particular, the controller 90 can control at least one of the fuel bypass valves 214 or the lubricant bypass valves 244 to prevent the fuel temperature of the fuel from increasing above a fuel temperature threshold or to prevent the lubricant from increasing above a lubricant temperature threshold. If the fuel temperature of the fuel increases above the fuel temperature threshold, the fuel can begin to cook and carbonaceous deposits (also known as coke) form in the fuel, which reduces the propulsive efficiency of the gas turbine engine 10 (FIG. 1). Thus, the fuel temperature threshold corresponds to a temperature of the fuel just before the fuel cooks and coke is produced in the fuel. In some embodiments, the fuel temperature threshold is a single value, such as, for example, three hundred degrees Fahrenheit (300° F.). In some embodiments, the fuel temperature threshold can include a range, such as, for example, two hundred seventy degrees Fahrenheit to three hundred degrees Fahrenheit (270° F. to 300° F.).

If the lubricant temperature of the lubricant increases above the lubricant temperature threshold, the lubricant can begin to cook and carbonaceous deposits (also known as coke) form in the lubricant, which reduces the lubrication or cooling capabilities of lubricant, and, thus, the gears of the gearbox assembly 100 may become damaged. Thus, the lubricant temperature threshold corresponds to a temperature of the lubricant just before the lubricant cooks and coke is produced in the lubricant. In some embodiments, the lubricant temperature threshold is a single value, such as, for example, three hundred twenty-five degrees Fahrenheit (325° F.). In some embodiments, the lubricant temperature threshold can include a range, such as, for example, two hundred seventy degrees Fahrenheit to three hundred twenty-five degrees Fahrenheit (270° F. to 325° F.).

The controller 90 can control at least one of the one or more fuel bypass valves 214 or the one or more lubricant bypass valves 244 to bypass the fuel or the lubricant around the fuel-lubricant heat exchanger 210 if the fuel temperature is equal to or greater than the fuel temperature threshold or if the lubricant temperature is equal to or greater than the lubricant temperature threshold. In this way, the controller 90 controls at least one of the fuel bypass valves 214 or the lubricant bypass valves 244 to avoid the fuel or the lubricant from cooking.

The controller 90 can control at least one of the first fuel bypass valve 214a, the second bypass valve 214b, the third bypass valve 214c, or the lubricant bypass valves 244. In particular, the controller 90 can control the first fuel bypass valve 214a to direct the fuel through the first fuel bypass line 212a to bypass around the fuel-lubricant heat exchanger 210. In this way, the fuel through the first fuel bypass line 212a does not pass through the fuel-lubricant heat exchanger 210 and does not absorb heat from the lubricant. This prevents the fuel temperature of the fuel through the first fuel bypass line 212a from increasing towards the fuel temperature threshold. When the first bypass valve 214a is a proportional valve, the controller 90 can control the first bypass valve 214a to direct a portion of the fuel into the first fuel bypass line 212a such that at least some of the fuel is directed through the fuel-lubricant heat exchanger 210. In some embodiments, substantially all of the fuel is directed into the first fuel bypass line 212a to bypass the fuel-lubricant heat exchanger 210 such that almost none, or none, of the fuel is directed through the fuel-lubricant heat exchanger 210.

When the fuel is bypassing the fuel-lubricant heat exchanger 210 through the first fuel bypass line 212a, the controller 90 can control the second fuel bypass valve 214b to either direct the fuel to the combustion section 28 or to bypass the combustion section 28 through the second fuel bypass line 212b. For example, if the fuel is bypassing the fuel-lubricant heat exchanger 210 and the fuel temperature is still equal to or greater than the fuel temperature threshold, then the controller 90 can control the second fuel bypass valve 214b to direct at least a portion of the fuel into the second fuel bypass line 212b. If the fuel temperature is less than the fuel temperature threshold, the controller 90 can control the second fuel bypass valve 214b to direct the fuel through the fuel supply line 208 to the combustion section 28. Such a configuration allows the fuel to cool further prior to being delivered to the combustion section 28 to avoid delivering overheated fuel (e.g., with coke) to the combustion section 28.

When the fuel is bypassing the combustion section through the second fuel bypass line 212b, the controller 90 can control the third fuel bypass valve 214c to either direct the fuel to the fuel supply line 208 upstream of the fuel-lubricant heat exchanger 210 through the second fuel bypass line 212b or to the fuel supply line 208 downstream of the fuel-lubricant heat exchanger 210 through the third fuel bypass line 212c. For example, if the fuel is bypassing the combustion section 28 through the second fuel bypass line 212b and the fuel temperature is still equal to or greater than the fuel temperature threshold, then the controller 90 can control the third fuel bypass valve 214c to direct at least a portion of the fuel into the third fuel bypass line 212c. If the fuel temperature is less than the fuel temperature threshold, the controller 90 can control the third fuel bypass valve 214c to direct the fuel through the second fuel bypass line 212b to the fuel supply line 208 upstream of the fuel-lubricant heat exchanger 210. Such a configuration allows the fuel to bypass the combustion section 28 and recirculate through the fuel supply line 208 while taking the fuel-lubricant heat exchanger 210 in or out of the recirculation loop based on the fuel temperature.

The controller 90 can also control the one or more fuel bypass valves 214 based on the lubricant temperature of the lubricant in the lubrication system 230. In particular, the controller 90 can control the one or more fuel bypass valves 214 to direct the fuel through the fuel-lubricant heat exchanger 210 if the lubricant temperature is equal to or greater than the lubricant temperature threshold. The controller 90 can control the one or more fuel bypass valves 214 to bypass the fuel around the fuel-lubricant heat exchanger 210 if the lubricant temperature is less than the lubricant temperature threshold. In this way, the fuel absorbs the heat from the lubricant in the fuel-lubricant heat exchanger 210 to cool the lubricant when the lubricant temperature is approaching the lubricant temperature threshold. Otherwise, the fuel can bypass the fuel-lubricant heat exchanger 210 if the lubricant does not need to be cooled (e.g., the lubricant temperature is not approaching the lubricant temperature threshold).

Similarly, the controller 90 can control the lubricant bypass valves 244 to direct the lubricant through the fuel-lubricant heat exchanger 210 if the lubricant temperature is equal to or greater than the lubricant temperature threshold. In this way, the fuel absorbs the heat from the lubricant in the fuel-lubricant heat exchanger 210 to cool the lubricant such that the lubricant temperature decreases to less than the lubricant temperature threshold prior to the lubricant being delivered to the gearbox assembly 100. If the lubricant temperature is less than the lubricant temperature threshold, the controller 90 can control the lubricant bypass valves 244 to direct the lubricant through the lubricant bypass lines 242 to bypass the fuel-lubricant heat exchanger 210. In this way, the lubricant through the lubricant bypass lines 242 does not pass through the fuel-lubricant heat exchanger 210 and is not cooled by the fuel. This also prevents the fuel temperature of the fuel through the fuel-lubricant heat exchanger 210 from increasing towards the fuel temperature threshold.

In some embodiments, the fuel can bypass the combustion section 28 to an accumulator to fill the accumulator. For example, the accumulator can be in fluid communication with the second fuel bypass line 212b or with the third fuel bypass line 212c for collecting and storing the fuel in the second fuel bypass line 212b or the third fuel bypass line 212c. The fuel delivery system 202 can then direct the fuel in the accumulator through the thermal management system 200 (e.g., through the fuel-lubricant heat exchanger 210) to provide additional cooling capabilities for cooling the lubricant. In some embodiments, the fuel can bypass the combustion section 28 to be returned to the aircraft, for example, to the fuel tank 204. In some embodiments, the fuel can bypass the combustion section 28 to be cooled by an air heat exchanger (e.g., an air-cooled fuel cooler) before being returned to the aircraft (e.g., to the fuel tank 204). In some embodiments, the fuel can bypass the combustion section 28 to be cooled by an air heat exchanger (e.g., an air-cooled fuel cooler) before being returned directly to the fuel supply line 208.

Figure 5:
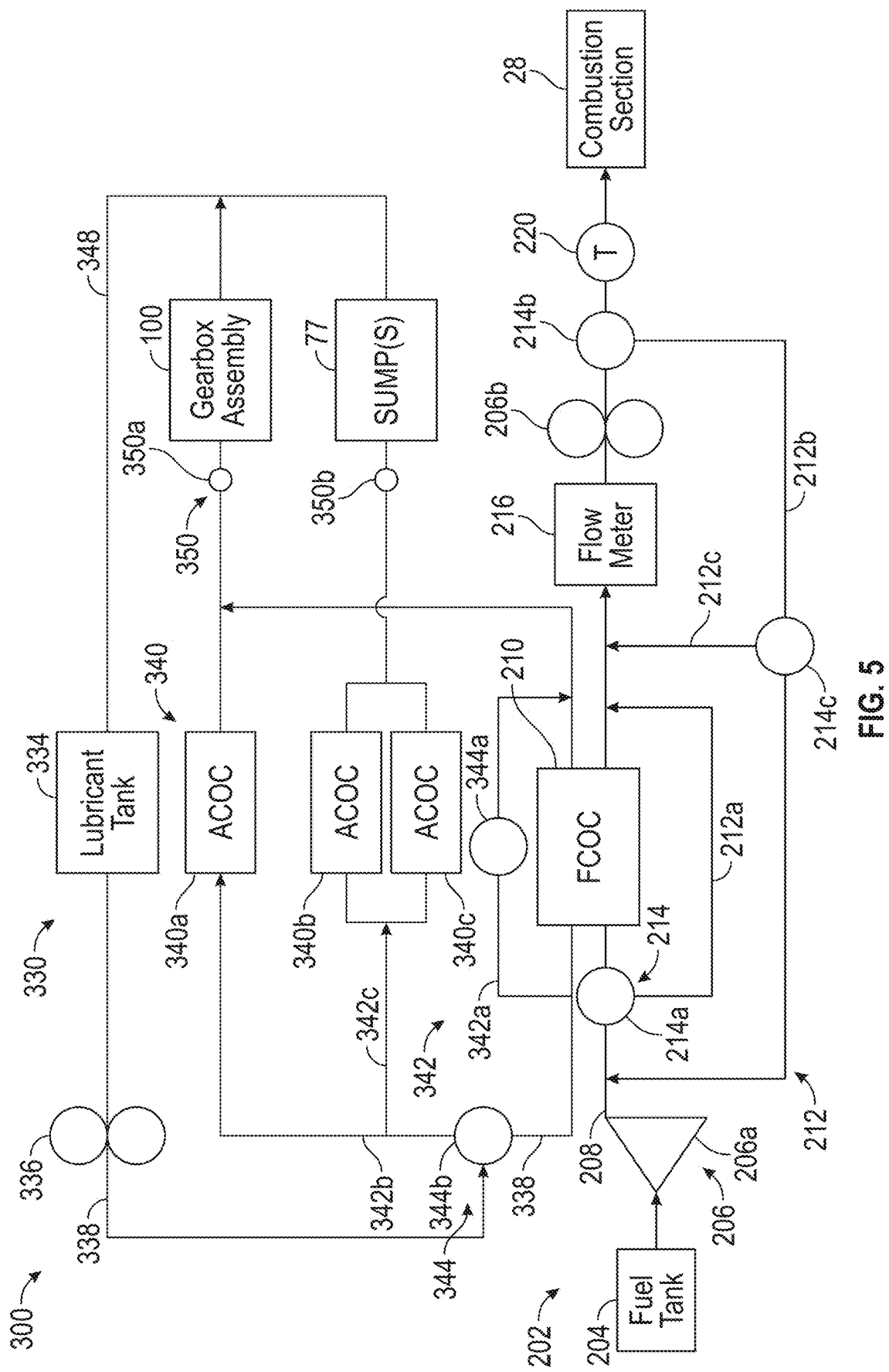
FIG. 5 is a schematic diagram of a thermal management system for the gas turbine engine of FIG. 1, according to an embodiment of the present disclosure.

FIG. 5 is a schematic diagram of a thermal management system 300 for the gas turbine engine 10, according to an embodiment of the present disclosure. The thermal management system 300 is substantially similar to the thermal management system 200 of FIG. 4. The same or similar reference numerals will be used for components of the thermal management system 300 that are the same as or similar to the components of the thermal management system 200 discussed above, unless stated otherwise. The description of these components above also applies to this embodiment, and a detailed description of these components is omitted here.

As shown in FIG. 5, the gas turbine engine 10 includes one or more sumps 77, the fuel delivery system 202, and a lubrication system 330 including a lubricant tank 334, one or more lubricant pumps 336, and a lubricant supply line 338. The sumps 77 include reservoirs, or the like, that collect the lubricant that drains from the gearbox assembly 100 or from the engine bearings 76. The thermal management system 300 includes the fuel-lubricant heat exchanger 210, one or more air-cooled oil coolers (ACOC), also referred to as one or more air-lubricant heat exchangers 340, one or more lubricant bypass lines 342, one or more lubricant bypass valves 344, a lubricant return line 348, and one or more lubricant sensors 350.

The one or more air-lubricant heat exchangers 340 include heat exchangers for cooling the lubricant that is delivered to the gearbox assembly 100 or to the sumps 77 using air, as detailed further below. The air can be supplied from the compressor section 22 (e.g., as bleed air) or from outside the gas turbine engine 10 (e.g., as ambient air). The one or more air-lubricant heat exchangers 340 include a first air-lubricant heat exchanger 340a, a second air-lubricant heat exchanger 340b, and a third air-lubricant heat exchanger 340c in fluid communication with the lubricant bypass lines 342, as detailed further below.

The one or more lubricant bypass lines 342 include a first lubricant bypass line 342a, a second lubricant bypass line 342b, and a third lubricant bypass line 342c. The first lubricant bypass line 342a is in fluid communication with the lubricant supply line 338. The first lubricant bypass line 342a includes an inlet that is upstream of the fuel-lubricant heat exchanger 210 and an outlet that is downstream of the fuel-lubricant heat exchanger 210. In this way, the first lubricant bypass line 342a directs the lubricant to bypass the fuel-lubricant heat exchanger 210. The second lubricant bypass line 342b is in fluid communication with the lubricant supply line 338. The second lubricant bypass line 342b includes an inlet that is upstream of the first lubricant bypass line 342a (e.g., upstream of the fuel-lubricant heat exchanger 210 and an outlet that is downstream of the fuel-lubricant heat exchanger 210. In this way, the second lubricant bypass line 342b directs the lubricant to bypass the fuel-lubricant heat exchanger 210 from upstream of the first lubricant bypass line 342a to downstream of the fuel-lubricant heat exchanger 210. The third lubricant bypass line 342c is in fluid communication with the second lubricant bypass line 342b and the one or more sumps 77 for directing the lubricant to the one or more sumps 77. The third lubricant bypass line 342c includes an inlet at the second lubricant bypass line 342b that is upstream of the outlet of the second lubricant bypass line 342b and an outlet that is at the one or more sumps 77. In this way, the third lubricant bypass line 342c directs the lubricant from the second lubricant bypass line 342b to the one or more sumps 77 to bypass the fuel-lubricant heat exchanger 210.

The first air-lubricant heat exchanger 340a is in fluid communication with the second lubricant bypass line 342b downstream of the inlet of the third lubricant bypass line 342c and upstream of the outlet of the second lubricant bypass line 342b for cooling the lubricant through the second lubricant bypass line 342b prior to directing the lubricant to the gearbox assembly 100. The second air-lubricant heat exchanger 340b is in fluid communication with the third lubricant bypass line 342c for cooling the lubricant through the third lubricant bypass line 342c prior to directing the lubricant to the sumps 77. The third air-lubricant heat exchanger 340c is also in fluid communication with the third lubricant bypass line 342c for cooling the lubricant through the third lubricant bypass line 342c prior to directing the lubricant to the sumps 77. The third air-lubricant heat exchanger 340c provides additional cooling in addition to the cooling provided by the second air-lubricant heat exchanger 340b.

The lubricant bypass valves 344 include a first lubricant bypass valve 344a and a second lubricant bypass valve 344b. The first lubricant bypass valve 344a is in fluid communication with the first lubricant bypass line 342a. In some embodiments, the first lubricant bypass valve 344a is positioned at the inlet of the first lubricant bypass line 342a such that the first lubricant bypass valve 344a is in fluid communication with the first lubricant bypass line 342a and the lubricant supply line 338. In particular, the inlet of the first lubricant bypass valve 344a is fluidly coupled with the lubricant supply line 338, a first outlet of the first lubricant bypass valve 344a is fluidly coupled with the lubricant supply line 338, and a second outlet of the first lubricant bypass valve 344a is fluidly coupled with the first lubricant bypass line 342a. In this way, the first lubricant bypass valve 344a can be controlled (e.g., by the controller 90) to selectively direct the lubricant through the lubricant supply line 338 or through the first lubricant bypass line 342a, as detailed further below.

The second lubricant bypass valve 344b is in fluid communication with the lubricant supply line 338 and the second lubricant bypass line 342b such that the second lubricant bypass valve 344b is upstream of the first lubricant bypass line 342a. In particular, the inlet of the second lubricant bypass valve 344b is fluidly coupled with the lubricant supply line 338, a first outlet of the second lubricant bypass valve 344b is fluidly coupled with the lubricant supply line 338, and a second outlet of the second lubricant bypass valve 344b is fluidly coupled with the second lubricant bypass line 342b. In this way, the second lubricant bypass valve 344b can be controlled (e.g., by the controller 90) to selectively direct the lubricant through the lubricant supply line 338 or through the second lubricant bypass line 342b, as detailed further below. While the third lubricant bypass line 342c is depicted as branching off of the second lubricant bypass line 342b, the one or more lubricant bypass valves 344 can include a third lubricant bypass valve at the inlet of the third lubricant bypass line 342c to selectively control the lubricant through the third lubricant bypass line 342c.

The lubricant return line 348 is in fluid communication with the gearbox assembly 100 and the lubricant tank 334 for returning the lubricant from the gearbox assembly 100 to the lubricant tank 334. The lubricant return line 348 is also in fluid communication with the one or more sumps 77 for returning the lubricant from the sumps 77 to the lubricant tank 334. In this way, the lubricant is recirculated through the lubrication system 330.

The one or more lubricant sensors 350 sense data indicative of one or more parameters of the lubricant in the lubrication system 330. For example, the lubricant sensors 350 can include temperature sensors, pressure sensors, or flow rate sensors. In FIG. 5, the lubricant sensors 350 include temperature sensors for sensing data indicative of a temperature of the lubricant in the lubrication system 330. In particular, the lubricant sensors 350 include a first lubricant sensor 350a positioned in the lubricant supply line 338 downstream of the fuel-lubricant heat exchanger 210 and the outlet of the second lubricant bypass line 342b and upstream of the gearbox assembly 100. In this way, the first lubricant sensor 350a senses the data indicative of the temperature of the lubricant prior to the lubricant being delivered to the gearbox assembly 100. The lubricant sensors 350 also include a second lubricant sensor 350b positioned in the third lubricant bypass line 342c downstream of the second air-lubricant heat exchanger 340b and the third air-lubricant heat exchanger 340c and upstream of the sumps 77. In this way, the second lubricant sensor 350b senses the data indicative of the temperature of the lubricant prior to the lubricant being delivered to the sumps 77.

The thermal management system 300 operates substantially similar to the thermal management system 200 in FIG. 4. In operation, the controller 90 can control the first lubricant bypass valve 344a to bypass the lubricant around the fuel-lubricant heat exchanger 210. The controller 90 can also control the second lubricant bypass valve 344b to bypass the lubricant into the second lubricant bypass line 342b based on the lubricant temperature or the fuel temperature. In particular, the controller 90 can control the first lubricant bypass valve 344a and the second lubricant bypass valve 344b to direct the lubricant through the fuel-lubricant heat exchanger 210 if the lubricant temperature is equal to or greater than the lubricant temperature threshold. If the lubricant temperature is less than the lubricant temperature threshold, the controller 90 can control at least one of the first lubricant bypass valve 344a or the second lubricant bypass valve 344b to direct the lubricant through the lubricant bypass lines 342 to bypass the fuel-lubricant heat exchanger 210. The lubricant through the second lubricant bypass line 342b is cooled through the first air-lubricant heat exchanger 340a. The lubricant through the third lubricant bypass line 342c is cooled through at least one of the second air-lubricant heat exchanger 340b or the third air-lubricant heat exchanger 340c. The air-lubricant heat exchangers 340 do not cool the lubricant as much as the fuel-lubricant heat exchanger 210, but the air-lubricant heat exchangers 340 ensure the lubricant is cooled prior to being delivered to the gearbox assembly 100 or the sumps 77.

Accordingly, the thermal management systems 200 and 300 can control the fuel temperature or the lubricant temperature to prevent the fuel or the lubricant from coking. Such a system allows for the fuel-lubricant heat exchanger 210 to have an effectiveness greater than 50%, and, thus, allows for the air-lubricant heat exchangers to be reduced in size as compared to thermal management systems without the benefit of the present disclosure. The effectiveness of the fuel-lubricant heat exchanger 210 is defined as $(T_{lubricant\_out} - T_{lubricant\_in})/(T_{lubricant\_in} - T_{fuel\_in})$, where $T_{lubricant\_out}$ is the lubricant temperature at the outlet of the fuel-lubricant heat exchanger 210, $T_{lubricant\_in}$ is the lubricant temperature at the inlet of the fuel-lubricant heat exchanger 210, and $T_{fuel\_in}$ is the fuel temperature at the inlet of the fuel-lubricant heat exchanger 210. In particular, the thermal management systems 200 and 300 allow the large air-cooled heat exchangers (e.g., about 350 KW) to be replaced with smaller air-cooled heat exchangers (e.g., about 25 kW), and, thus, reduce the weight of the heat exchangers compared to larger air-cooled heat exchangers. Therefore, the thermal management systems 200 and 300 disclosed herein provide for preventing the fuel and the lubricant from overheating (e.g., and coking), while reducing a weight of the thermal management systems 200 and 300, and, thus, provide for an overall reduced weight of the gas turbine engine 10 and the aircraft.

Referring back to FIG. 3, as the volume of the gearbox 101 increases, the diameter of the gearbox $D_{GB}$, increases. As the power output of the gearbox 101 increases the amount of heat generated increases. The increase in heat generation increases the volume of lubricant required to operate the gearbox, which calls for an increased gutter volume $V_G$ for capture and recirculation of lubricant through the scavenging system. However, it is also desired to reduce the overall footprint of the gearbox, oil and scavenge system given an emphasis on decreasing packaging space available for the gearbox and oil scavenge system, especially for engines with power gearboxes operating with relatively high gear ratios, e.g., between, inclusive of the endpoints, 2.5 to 3.5, 3.0, 3.25, 4.0 and above gear ratios (GRs).

In view of the foregoing, it is desirable to improve, or at least maintain, a target efficiency of a gearbox without oversizing a gutter or scavenge system, or while reducing its size to accommodate only what is needed or can be accommodated in terms of weight increase or volume. When developing a gas turbine engine, the interplay among components can make it particularly difficult to select or to develop one component (e.g., the gutter 114) during engine design and prototype testing, especially, when some components are at different stages of completion. For example, one or more components may be nearly complete, yet one or more other components may be in an initial or preliminary phase. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan section 14 design, compressor section 22 design, combustion section 28, or turbine section 30 design, may not be known at the time of design of the gutter, but such components impact the size of the gearbox 101 required and the amount of lubricant required, and thus, the design of the gutter 114.

The inventors desire to arrive at a more favorable balance between maximizing gearbox scavenge flow collection while minimizing other, potential negative effects on an improperly chosen gutter size had previously involved, e.g., the undertaking of multivariate trade studies, which may or may not have yielded an improved, or best match gutter/scavenge for a particular architecture. Unexpectedly, it was discovered that a relationship exists between the volume of the gutter and gearbox volume that uniquely identified a finite and readily ascertainable (in view of this disclosure) number of embodiments suited for a particular architecture, which improves the weight-volume-scavenge effectiveness tradeoffs for a particular architecture. This relationship the inventors refer to as the Lubricant Extraction Volume Ratio (LEVR):

$$LEVR = \frac{V_G}{V_{GB}} \tag{1}$$

$V_G$ represents the gutter volume, as identified with respect to FIGS. 2 and 3. The gutter volume may be determined by calculating the volume within a cross section of the gutter. $V_{GB}$ represents the gearbox volume, which is defined below (2). For engine power between eighteen kHP and thirty-five kHP, inclusive of the endpoints, the gearbox volume $V_{GB}$ is between eight hundred in$^3$ and two thousand in$^3$, inclusive of the endpoints. In some examples, the engine is a turbofan engine. The inventors found that the gutter volume $V_G$ should be selected based on the range 0.01≤LEVR≤ to 0.3 (gutter volume is between 1 percent and 30 percent the gearbox volume, inclusive of the endpoints).

$$V_{GB} = L_{GB} * \pi * \left(\frac{D_{GB}}{2}\right)^2 \tag{2}$$

$L_{GB}$ represents the gearbox length, as identified with respect to FIG. 2. Although described with respect to gears of the same length in FIG. 2, the gearbox length may be defined by any of the sun gear 102, a planet gear 104, or the ring gear 106, instances when the aforementioned gears are of different lengths. In (2), $D_{GB}$ represents the gearbox diameter, as identified with respect to FIG. 3.

Figure 6:
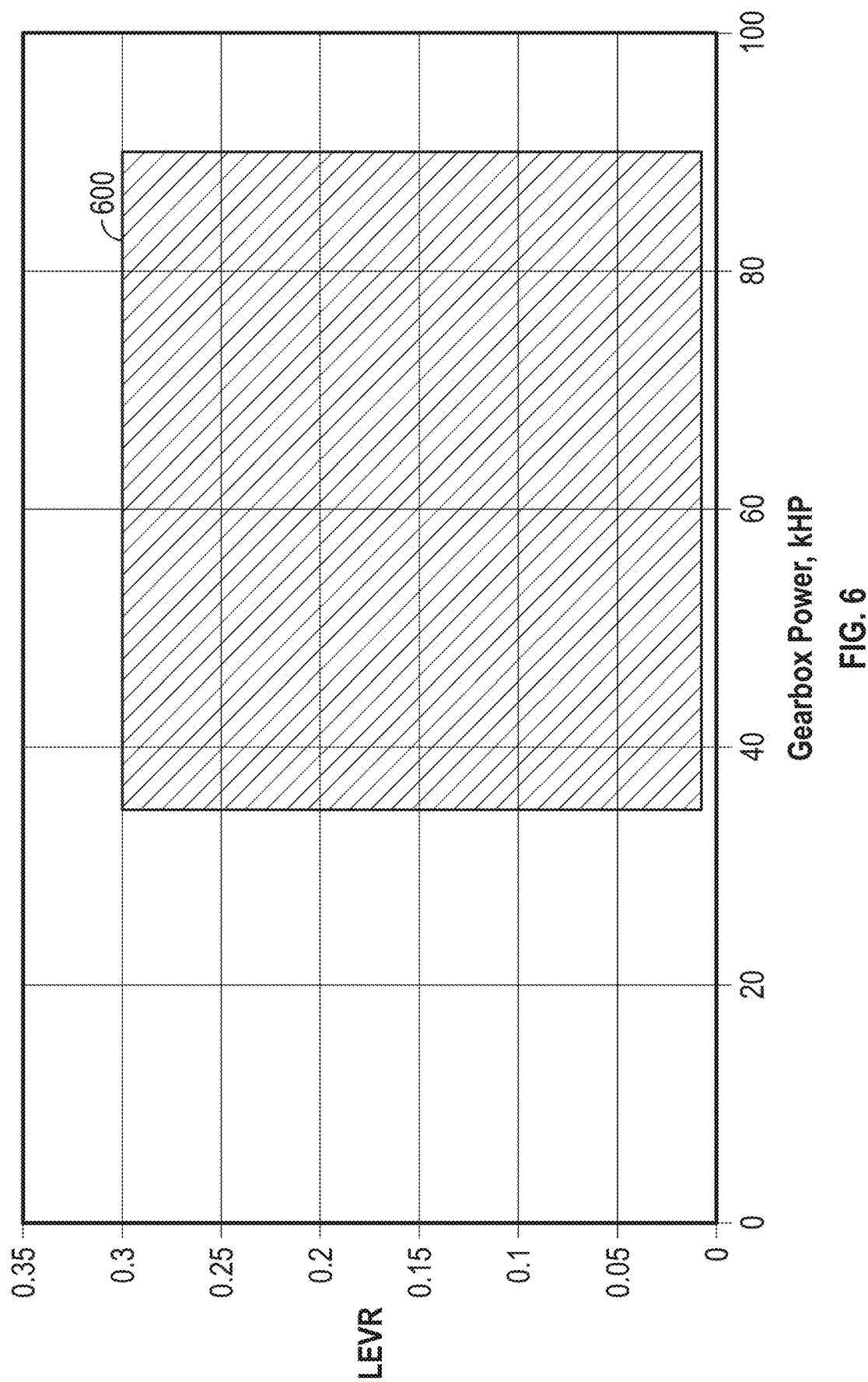
FIG. 6 illustrates a graph showing the lubricant extraction volume ratio as a function of gearbox power, according to an embodiment of the present disclosure.
Figure 7:
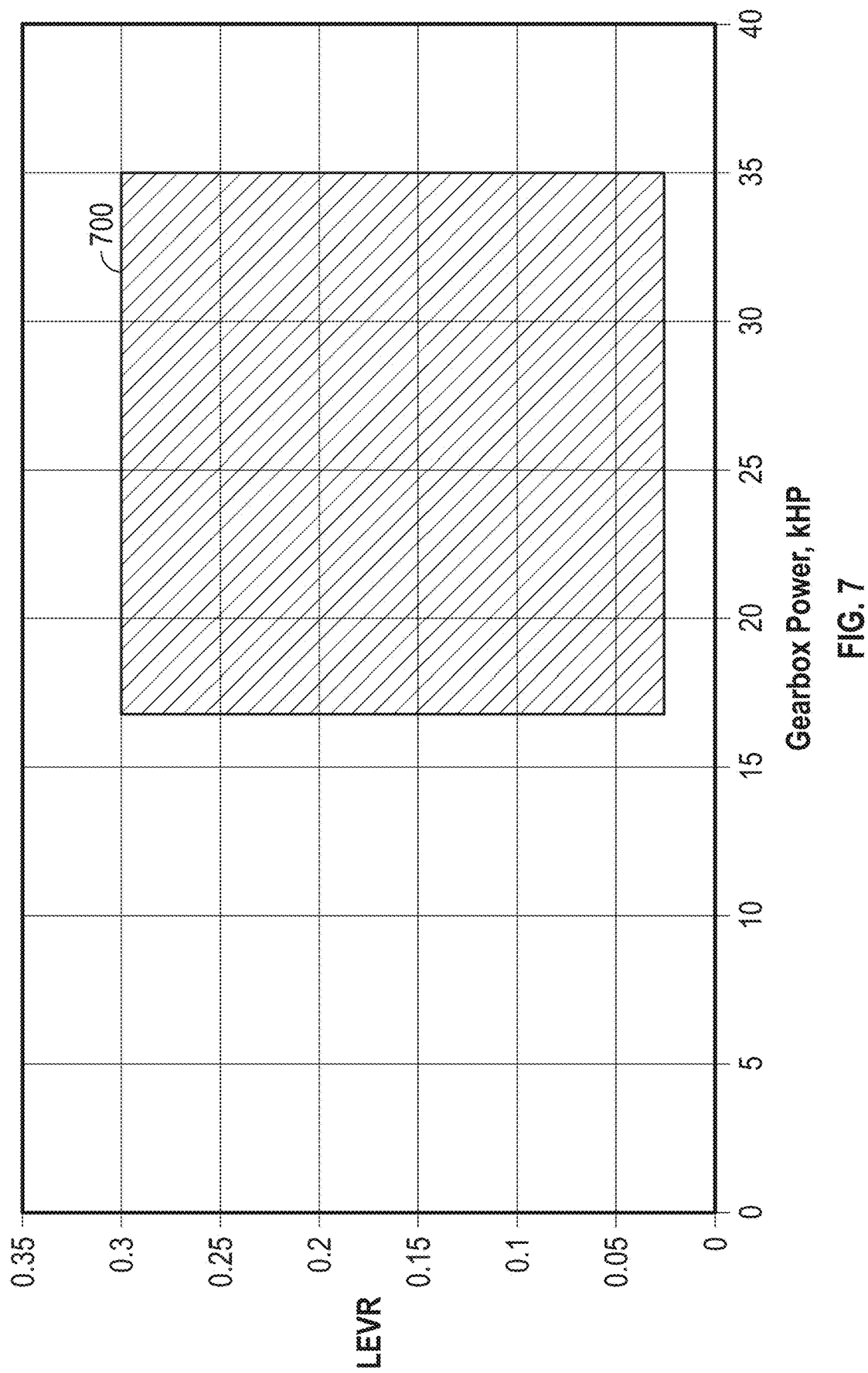
FIG. 7 illustrates a graph showing the lubricant extraction volume ratio as a function of gearbox power, according to an embodiment of the present disclosure.

In some embodiments, and as shown in a region 600 of FIG. 6, the LEVR is between 0.01 and 0.3, inclusive of the endpoints, for maximum gearbox power of between thirty-five kHP and ninety kHP, inclusive of the endpoints. In some embodiments, and as shown in a region 700 of FIG. 7, LEVR is between 0.03 and 0.3, inclusive of the endpoints, for a maximum gearbox power of less than or equal to thirty-five kHP.

If the gutter volume relative to the gearbox volume is such that the LEVR upper limit is exceeded (e.g., a "large gutter"), there is too large of a volume within the gutter than is needed to recover gearbox lubricant scavenge, which can lead to increased lubricant churning loss and lubricant foaming in the gutter, leading to increased power loss in the overall gearbox assembly. The foaming in the gutter can generate drag in the gutter and negatively impact gearbox performance, and ultimately, engine performance. Furthermore, a large gutter requires more radial space and the increased material, mass, and size, etc., of the large gutter encroaches upon other system components within the engine (e.g., the core flow path), which, again, negatively impacts gearbox performance. The LEVR is selected to balance recovery of gearbox lubricant scavenge and impact to the engine operation and efficiency.

If the gutter volume relative to the gearbox volume is such that the LEVR lower limit is violated (e.g., a "small gutter"), there is too small of a volume within the gutter than is needed to recover the gearbox lubricant scavenge. The gutter will not fully capture the gearbox lubricant scavenge (e.g., flow $F_2$), leading to inadequate removal of the lubricant from the gearbox sump. This can lead to leakage of the scavenge lubricant back into the gearbox or to other areas of the engine, negatively impacting the performance of both the gearbox and the engine. The lower limit of the LEVR is selected to balance recovery of gearbox lubricant scavenge and impact to the gearbox and engine operation and efficiency (e.g., volume & weight penalty).

Taking into consideration the above considerations for selecting upper and lower limits, the LEVR may also be defined in terms of a Power Factor, Flow Transition Time and a Heat Density Parameter:

$$LEVR = PF * \frac{FT}{HDP} \quad (3)$$

where PF represents the Power Factor, FT represents the Flow Transition Time, and HDP represents the Heat Density parameter. The Power Factor PF is defined in (4):

$$PF = PD*(1-\eta) \quad (4)$$

where PD represents the gearbox power density and n represents the gearbox efficiency. The power density PD is a ratio of the power of the gearbox to the volume of the gearbox and is between fifteen thousand hp/ft$^3$ and forty-five thousand hp/ft$^3$, inclusive of the endpoints. The gearbox efficiency is between 99.2 percent and 99.8 percent, inclusive of the endpoints. The Flow Transition Time FT is given by:

$$FT = \frac{V_G}{V_{dot}} \quad (5)$$

where $V_G$ represents the gutter volume, as identified with respect to FIGS. 2 and 3. $V_{dot}$ represents the lubricant volumetric flow rate. The lubricant volumetric flow rate is defined by the gearbox power and the efficiency. Since the inefficiency of the gearbox generates heat, a certain quantity of lubricant is required to remove the heat. The Flow Transition Time is the time it takes the lubricant to traverse the entire gutter volume. The Flow Transition Time indirectly links the gutter volume to the gearbox volume. The Flow Transition Time is between 1.5 and eleven seconds, inclusive of the endpoints.

The Heat Density parameter HDP is defined as:

$$HDP = \rho * C * \Delta T \quad (6)$$

where p represents the fluid density, C represents the lubricant specific heat, and $\Delta T$ represents the temperature rise in the lubricant, which, is between twenty degrees Celsius and forty-five degrees Celsius, inclusive of the endpoints.

Table 1 describes exemplary embodiments 1 and 2 identifying the LEVR for various engines. The embodiments 1 and 2 are for narrow body, turbofan engines. The LEVR of the present disclosure is not limited to such engines, however, and may be applicable over a wide range of thrust class and engine designs, including, for example, wide body engines. In some examples, the engine may include, but is not limited to, business jet propulsion engines, small turbofan engines, open rotor engines, marine and industrial turbine engines, including portable power generation units, and marine propulsion for ships.

TABLE 1

| Embodiments | Power (kHP) | $V_G$ (in^3) | $V_{GB}$ (in^3) | LEVR |
|---|---|---|---|---|
| 1 | 20-30 | 253 | 5601 | .045 |
| 2 | 17 | 37 | 691 | .054 |

As the gearbox power, and, thus, the gearbox size/volume increases, the gutter volume also must increase to ensure proper function of the gutter. However, the relationship between LEVR and gearbox (fan) power is not linear. Furthermore, different gearbox configurations like planetary and differential could require more lubricant flow due to the lower efficiency compared to a star gearbox configuration. Therefore, these higher power gearboxes with different operating configurations could yield LEVR nearing 0.3. Accordingly, for star gearbox configurations, Table 1 shows this relationship.

Accordingly, the gutter volume is critical to minimizing the lubricant scavenge losses as the lubricant exits the gearbox and is redirected to the scavenge port of the gutter.

Therefore, the present disclosure defines a lubricant extraction volume ratio that improves or maintains gearbox efficiency, while ensuring the gutter provided with the gearbox is not oversized or undersized with respect to the needs of the gearbox. By maintaining the gutter within the range defined by the lubricant extraction volume ratio, scavenge flow collection is maximized and the negative effects of the gutter (e.g., added weight and size to the system) that may contribute to a reduction in gearbox efficiency are minimized.

Further aspects of the present disclosure are provided by the subject matter of the following clauses.

According to an aspect of the present disclosure, a gearbox assembly comprises a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gearbox assembly of the preceding clause, wherein the lubricant extraction volume ratio is between 0.03 and 0.3, inclusive of the endpoints, for a gearbox power less than or equal to thirty-five kHP.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gutter volume is defined by an inner surface of a gutter wall of the gutter.

The gearbox assembly of any preceding clause, wherein the gearbox volume is defined by an outer diameter of the gearbox and a gearbox length of the gearbox.

The gearbox assembly of any preceding clause, wherein the outer diameter of the gearbox is an outer diameter of a ring gear.

The gearbox assembly of any preceding clause, wherein the gearbox length is defined between a forwardmost end of a gear of the gearbox and an aftmost end of the gear.

The gearbox assembly of any preceding clause, wherein the gearbox includes a sun gear, a plurality of planet gears, and a ring gear.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gearbox volume is defined by an outer diameter of the ring gear and a length of the gearbox.

The gearbox assembly of any preceding clause, wherein the lubricant extraction volume ratio is defined by a power factor, a flow transition time, and a heat density parameter.

The gearbox assembly of any preceding clause, wherein the flow transition time is defined by a gutter volume of the gutter and a lubricant volumetric flow rate of a lubricant through the gearbox.

The gearbox assembly of any preceding clause, wherein the flow transition time is between 1.5 seconds and eleven seconds, inclusive of the endpoints.

The gearbox assembly of any preceding clause, wherein the power factor is defined by a power density of the gearbox and an efficiency of the gearbox.

The gearbox assembly of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gearbox assembly of any preceding clause, wherein the gearbox includes a sun gear, a plurality of planet gears, and a ring gear, and wherein the gutter circumscribes the ring gear.

The gearbox assembly of any preceding clause, wherein the gutter wholly circumscribes the ring gear.

The gearbox assembly of any preceding clause, wherein the gutter partially circumscribes the ring gear.

The gearbox assembly of any preceding clause, wherein the gutter is located radially outward of the gearbox.

The gearbox assembly of any preceding clause, wherein the gutter further comprises a scavenge port located near a bottom of the gutter.

The gearbox assembly of any preceding clause, wherein the gearbox is a star configuration.

The gearbox assembly of any preceding clause, wherein the gearbox is a planetary configuration.

The gearbox assembly of any preceding clause, wherein the gearbox is a differential gearbox.

The gearbox assembly of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gearbox assembly of any preceding clause, wherein the gutter volume is between 0.01 and 0.3 times, inclusive of the endpoints, the gearbox volume.

According to an aspect of the present disclosure, a gas turbine engine comprises a gearbox assembly comprising a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gas turbine engine of any preceding clause, wherein the lubricant extraction volume ratio is between 0.01 and 0.3, inclusive of the endpoints, when the gas turbine engine has an engine power greater than or equal to thirty-five kHP.

The gas turbine engine of any preceding clause, wherein the engine power is between thirty-five kHP and ninety kHP, inclusive of the endpoints.

The gas turbine engine of any preceding clause, wherein the lubricant extraction volume ratio is between 0.03 and 0.3, inclusive of the endpoints.

The gas turbine engine of any preceding clause, wherein the lubricant extraction volume ratio is between 0.03 and 0.3, inclusive of the endpoints, when the gas turbine engine has an engine power less than or equal to thirty-five kHP.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gutter volume is defined by an inner surface of a gutter wall of the gutter.

The gas turbine engine of any preceding clause, wherein the gearbox volume is defined by an outer diameter of the gearbox and a gearbox length of the gearbox.

The gas turbine engine of any preceding clause, wherein the outer diameter of the gearbox is an outer diameter of a ring gear.

The gas turbine engine of any preceding clause, wherein the gearbox length is defined between a forwardmost end of a gear of the gearbox and an aftmost end of the gear.

The gas turbine engine of any preceding clause, wherein the gearbox includes a sun gear, a plurality of planet gears, and a ring gear.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gearbox volume is defined by an outer diameter of the ring gear and a length of the gearbox.

The gas turbine engine of any preceding clause, wherein the lubricant extraction volume ratio is defined by a power factor, a flow transition time, and a heat density parameter.

The gas turbine engine of any preceding clause, wherein the power factor is defined by a power density of the gearbox and an efficiency of the gearbox.

The gas turbine engine of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gas turbine engine of any preceding clause, wherein the flow transition time is defined by a gutter volume of the gutter and a lubricant volumetric flow rate of a lubricant through the gearbox.

The gas turbine engine of any preceding clause, wherein the flow transition time is between 1.5 seconds and eleven seconds, inclusive of the endpoints.

The gas turbine engine of any preceding clause, wherein the gearbox includes a sun gear, a plurality of planet gears, and a ring gear, and wherein the gutter circumscribes the ring gear.

The gas turbine engine of any preceding clause, wherein the gutter wholly circumscribes the ring gear.

The gas turbine engine of any preceding clause, wherein the gutter partially circumscribes the ring gear.

The gas turbine engine of any preceding clause, wherein the gutter is located radially outward of the gearbox.

The gas turbine engine of any preceding clause, wherein the gutter further comprises a scavenge port located near a bottom of the gutter.

The gas turbine engine of any preceding clause, wherein the gearbox is a star configuration.

The gas turbine engine of any preceding clause, wherein the gearbox is a planetary configuration.

The gas turbine engine of any preceding clause, wherein the gearbox is a differential gearbox.

The gas turbine engine of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gas turbine engine of any preceding clause, wherein the gutter volume is between 0.01 and 0.3 times, inclusive of the endpoints, the gearbox volume.

A gas turbine engine comprising a compressor section, a turbine section, and a combustion section in fluid communication with the compressor section and the turbine section, a gearbox assembly comprising a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

wherein $V_G$ is the gutter volume of the gutter and $V_{GB}$ is the gearbox volume, a fuel delivery system comprising a fuel tank that stores fuel therein, and a fuel supply line in fluid communication with the fuel tank and the combustion section for delivering the fuel from the fuel tank to the combustion section, a lubrication system comprising a lubricant tank that stores lubricant therein, and a lubricant supply line in fluid communication with the lubricant tank and the gearbox assembly for delivering the lubricant from the lubricant tank to the gearbox assembly, and a thermal management system comprising a fuel-lubricant heat exchanger in fluid communication with the fuel supply line and the lubricant supply line, the fuel-lubricant heat exchanger cooling the lubricant with the fuel as the lubricant and the fuel flow through the fuel-lubricant heat exchanger, one or more fuel bypass lines in fluid communication with the fuel supply line for bypassing the fuel around the fuel-lubricant heat exchanger, and one or more lubricant bypass lines in fluid communication with the lubricant supply line for bypass the lubricant around the fuel-lubricant heat exchanger, wherein the thermal management system selectively directs at least one of the fuel through the one or more fuel bypass lines or the lubricant through the one or more lubricant bypass lines based on at least one of a fuel temperature of the fuel or a lubricant temperature of the lubricant.

The gas turbine engine of the preceding clause, wherein the thermal management system further comprises one or more fuel bypass valves that selectively direct the fuel through the fuel supply line or through the one or more fuel bypass lines.

The gas turbine engine of any preceding clause, wherein the thermal management system further comprises one or more lubricant bypass valves that selectively direct the lubricant through the lubricant supply line or through the one or more lubricant bypass lines.

The gas turbine engine of any preceding clause, wherein the thermal management system further comprises one or more air-lubricant heat exchangers in fluid communication with the one or more lubricant bypass lines that cool the lubricant with air as the lubricant flows through the one or more lubricant bypass lines.

The gas turbine engine of any preceding clause, wherein the one or more lubricant bypass lines include a first lubricant bypass line having an inlet at the lubricant supply line that is upstream of the fuel-lubricant heat exchanger and an outlet at the lubricant supply line that is downstream of the fuel-lubricant heat exchanger to bypass the lubricant around the fuel-lubricant heat exchanger.

The gas turbine engine of any preceding clause, wherein the one or more lubricant bypass lines include a second lubricant bypass line having an inlet at the lubricant supply line that is upstream of the inlet of the first lubricant bypass line and an outlet at the lubricant supply line that is downstream of the fuel-lubricant heat exchanger to bypass the lubricant around the fuel-lubricant heat exchanger.

The gas turbine engine of any preceding clause, wherein the one or more lubricant bypass lines include a third lubricant bypass line having an inlet at the second lubricant bypass line and an outlet at one or more sumps of the gas turbine engine to bypass the lubricant around the fuel-lubricant heat exchanger and to the one or more sumps.

The gas turbine engine of any preceding clause, wherein the one or more fuel bypass lines include a first fuel bypass line having an inlet at the fuel supply line that is upstream of the fuel-lubricant heat exchanger and an outlet at the fuel supply line that is downstream of the fuel-lubricant heat exchanger to bypass the fuel around the fuel-lubricant heat exchanger.

The gas turbine engine of any preceding clause, wherein the one or more fuel bypass lines include a second fuel bypass line having an inlet at the fuel supply line that is downstream of the fuel-lubricant heat exchanger and upstream of the combustion section and an outlet at the fuel supply line that is upstream of the fuel-lubricant heat exchanger to bypass the fuel around the combustion section and back to the fuel-lubricant heat exchanger.

The gas turbine engine of any preceding clause, wherein the one or more fuel bypass lines include a third fuel bypass line having an inlet at the second fuel bypass line that is upstream of the outlet of the second fuel bypass line and an outlet at the fuel supply line that is downstream of the fuel-lubricant heat exchanger to bypass the fuel around the combustion section and around the fuel-lubricant heat exchanger.

The gas turbine engine of any preceding clause, further comprising a controller that controls the thermal management system to direct the at least one of the fuel through the one or more fuel bypass lines or the lubricant through the one or more lubricant bypass lines.

The gas turbine engine of any preceding clause, wherein the controller controls the thermal management system to direct the fuel through the one or more fuel bypass lines if at least one of the fuel temperature is equal to or greater than a fuel temperature threshold or the lubricant temperature is less than a lubricant temperature threshold.

The gas turbine engine of any preceding clause, wherein the controller controls the thermal management system to direct the fuel through the fuel-lubricant heat exchanger if at least one of the fuel temperature is less than the fuel temperature threshold or the lubricant temperature is equal to or greater than the lubricant temperature threshold.

The gas turbine engine of any preceding clause, wherein the controller controls the thermal management system to direct the lubricant through the fuel-lubricant heat exchanger if at least one of the lubricant temperature is equal to or greater than a lubricant temperature threshold or the fuel temperature is less than a fuel temperature threshold.

The gas turbine engine of any preceding clause, wherein the controller controls the thermal management system to direct the lubricant through the one or more lubricant bypass lines if at least one of the lubricant temperature is less than the lubricant temperature threshold or the fuel temperature is equal to or greater than the fuel temperature threshold.

A gas turbine engine comprising a compressor section, a turbine section, and a combustion section in fluid communication with the compressor section and the turbine section, a gearbox assembly comprising a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

wherein $V_G$ is the gutter volume of the gutter and $V_{GB}$ is the gearbox volume, a fuel delivery system comprising a fuel tank that stores fuel therein, a fuel supply line in fluid communication with the fuel tank and the combustion section; and one or more fuel pumps for delivering the fuel from the fuel tank to the combustion section through the fuel supply line, a lubrication system comprising a lubricant tank that stores lubricant therein, a lubricant supply line in fluid communication with the lubricant tank and the gearbox assembly, and one or more lubricant pumps for delivering the lubricant from the lubricant tank to the gearbox assembly through the lubricant supply line, and a thermal management system comprising a fuel-lubricant heat exchanger in fluid communication with the fuel supply line and the lubricant supply line, the fuel-lubricant heat exchanger cooling the lubricant with the fuel as the lubricant and the fuel flow through the fuel-lubricant heat exchanger, one or more fuel bypass lines in fluid communication with the fuel supply line for bypassing the fuel around the fuel-lubricant heat exchanger, one or more fuel bypass valves that selectively direct the fuel through the fuel supply line or through the one or more fuel bypass lines, one or more lubricant bypass lines in fluid communication with the lubricant supply line for bypass the lubricant around the fuel-lubricant heat exchanger, and one or more lubricant bypass valves that selectively direct the lubricant through the lubricant supply line or through the one or more lubricant bypass lines, and a controller that controls the one or more fuel bypass valves or the one or more lubricant bypass valves to selectively direct at least one of the fuel through the one or more fuel bypass lines or the lubricant through the one or more lubricant bypass lines based on at least one of a fuel temperature of the fuel or a lubricant temperature of the lubricant.

The gas turbine engine of the preceding clause, wherein the controller controls the one or more fuel bypass valves to direct the fuel through the one or more fuel bypass lines if at least one of the fuel temperature is equal to or greater than a fuel temperature threshold or the lubricant temperature is less than a lubricant temperature threshold.

The gas turbine engine of any preceding clause, wherein the controller controls the one or more fuel bypass valves to direct the fuel through the fuel-lubricant heat exchanger if at least one of the fuel temperature is less than the fuel temperature threshold or the lubricant temperature is equal to or greater than the lubricant temperature threshold.

The gas turbine engine of any preceding clause, wherein the controller controls the one or more lubricant bypass valves to direct the lubricant through the fuel-lubricant heat exchanger if at least one of the lubricant temperature is equal to or greater than a lubricant temperature threshold or the fuel temperature is less than a fuel temperature threshold.

The gas turbine engine of any preceding clause, wherein the controller controls the one or more lubricant bypass valves to direct the lubricant through the one or more lubricant bypass lines if at least one of the lubricant temperature is less than the lubricant temperature threshold or the fuel temperature is equal to or greater than the fuel temperature threshold.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:
a compressor section, a turbine section, and a combustion section in fluid communication with the compressor section and the turbine section;
a gearbox assembly comprising:
  a gearbox having a gearbox volume defined by an outer diameter of the gearbox and a gearbox length of the gearbox; and
  a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume; a fuel delivery system comprising:
a fuel tank that stores fuel therein; and
a fuel supply line in fluid communication with the fuel tank and the combustion section for delivering the fuel from the fuel tank to the combustion section;
a lubrication system comprising:
a lubricant tank that stores lubricant therein; and
a lubricant supply line in fluid communication with the lubricant tank and the gearbox assembly for delivering the lubricant from the lubricant tank to the gearbox assembly; and
a thermal management system comprising:
a fuel-lubricant heat exchanger in fluid communication with the fuel supply line and the lubricant supply line, the fuel-lubricant heat exchanger cooling the lubricant with the fuel as the lubricant and the fuel flows through the fuel-lubricant heat exchanger;

one or more fuel bypass lines in fluid communication with the fuel supply line for bypassing the fuel around the fuel-lubricant heat exchanger; and one or more lubricant bypass lines in fluid communication with the lubricant supply line for bypass the lubricant around the fuel-lubricant heat exchanger, wherein the thermal management system selectively directs at least one of the fuel through the one or more fuel bypass lines or the lubricant through the one or more lubricant bypass lines based on at least one of a fuel temperature of the fuel or a lubricant temperature of the lubricant.

2. The gas turbine engine of claim 1, wherein the thermal management system further comprises one or more fuel bypass valves that selectively direct the fuel through the fuel supply line or through the one or more fuel bypass lines.

3. The gas turbine engine of claim 1, wherein the thermal management system further comprises one or more lubricant bypass valves that selectively direct the lubricant through the lubricant supply line or through the one or more lubricant bypass lines.

4. The gas turbine engine of claim 1, wherein the thermal management system further comprises one or more air-lubricant heat exchangers in fluid communication with the one or more lubricant bypass lines that cool the lubricant with air as the lubricant flows through the one or more lubricant bypass lines.

5. The gas turbine engine of claim 1, wherein the one or more lubricant bypass lines include a first lubricant bypass line having an inlet at the lubricant supply line that is upstream of the fuel-lubricant heat exchanger and an outlet at the lubricant supply line that is downstream of the fuel-lubricant heat exchanger to bypass the lubricant around the fuel-lubricant heat exchanger.

6. The gas turbine engine of claim 5, wherein the one or more lubricant bypass lines include a second lubricant bypass line having an inlet at the lubricant supply line that is upstream of the inlet of the first lubricant bypass line and an outlet at the lubricant supply line that is downstream of the fuel-lubricant heat exchanger to bypass the lubricant around the fuel-lubricant heat exchanger.

7. The gas turbine engine of claim 6, wherein the one or more lubricant bypass lines include a third lubricant bypass line having an inlet at the second lubricant bypass line and an outlet at one or more sumps of the gas turbine engine to bypass the lubricant around the fuel-lubricant heat exchanger and to the one or more sumps.

8. The gas turbine engine of claim 1, wherein the one or more fuel bypass lines include a first fuel bypass line having an inlet at the fuel supply line that is upstream of the fuel-lubricant heat exchanger and an outlet at the fuel supply line that is downstream of the fuel-lubricant heat exchanger to bypass the fuel around the fuel-lubricant heat exchanger.

9. The gas turbine engine of claim 8, wherein the one or more fuel bypass lines include a second fuel bypass line having an inlet at the fuel supply line that is downstream of the fuel-lubricant heat exchanger and upstream of the combustion section and an outlet at the fuel supply line that is upstream of the fuel-lubricant heat exchanger to bypass the fuel around the combustion section and back to the fuel-lubricant heat exchanger.

10. The gas turbine engine of claim 9, wherein the one or more fuel bypass lines include a third fuel bypass line having an inlet at the second fuel bypass line that is upstream of the outlet of the second fuel bypass line and an outlet at the fuel supply line that is downstream of the fuel-lubricant heat exchanger to bypass the fuel around the combustion section and around the fuel-lubricant heat exchanger.

11. The gas turbine engine of claim 1, further comprising a controller that controls the thermal management system to direct the at least one of the fuel through the one or more fuel bypass lines or the lubricant through the one or more lubricant bypass lines.

12. The gas turbine engine of claim 11, wherein the controller controls the thermal management system to direct the fuel through the one or more fuel bypass lines if at least one of the fuel temperature is equal to or greater than a fuel temperature threshold or the lubricant temperature is less than a lubricant temperature threshold.

13. The gas turbine engine of claim 12, wherein the controller controls the thermal management system to direct the fuel through the fuel-lubricant heat exchanger if at least one of the fuel temperature is less than the fuel temperature threshold or the lubricant temperature is equal to or greater than the lubricant temperature threshold.

14. The gas turbine engine of claim 11, wherein the controller controls the thermal management system to direct the lubricant through the fuel-lubricant heat exchanger if at least one of the lubricant temperature is equal to or greater than a lubricant temperature threshold or the fuel temperature is less than a fuel temperature threshold.

15. The gas turbine engine of claim 14, wherein the controller controls the thermal management system to direct the lubricant through the one or more lubricant bypass lines if at least one of the lubricant temperature is less than the lubricant temperature threshold or the fuel temperature is equal to or greater than the fuel temperature threshold.

16. A gas turbine engine comprising:
a compressor section, a turbine section, and a combustion section in fluid communication with the compressor section and the turbine section;
a gearbox assembly comprising:
a gearbox having a gearbox volume defined by an outer diameter of the gearbox and a gearbox length of the gearbox; and
a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume;
a fuel delivery system comprising:
a fuel tank that stores fuel therein;
a fuel supply line in fluid communication with the fuel tank and the combustion section; and
one or more fuel pumps for delivering the fuel from the fuel tank to the combustion section through the fuel supply line;
a lubrication system comprising:
a lubricant tank that stores lubricant therein;
a lubricant supply line in fluid communication with the lubricant tank and the gearbox assembly; and one or more lubricant pumps for delivering the lubricant from the lubricant tank to the gearbox assembly through the lubricant supply line; and a thermal management system comprising:

a fuel-lubricant heat exchanger in fluid communication with the fuel supply line and the lubricant supply line, the fuel-lubricant heat exchanger cooling the lubricant with the fuel as the lubricant and the fuel flows through the fuel-lubricant heat exchanger;

one or more fuel bypass lines in fluid communication with the fuel supply line for bypassing the fuel around the fuel-lubricant heat exchanger;

one or more fuel bypass valves that selectively direct the fuel through the fuel supply line or through the one or more fuel bypass lines;

one or more lubricant bypass lines in fluid communication with the lubricant supply line for bypass the lubricant around the fuel-lubricant heat exchanger; and one or more lubricant bypass valves that selectively direct the lubricant through the lubricant supply line or through the one or more lubricant bypass lines; and a controller that controls the one or more fuel bypass valves or the one or more lubricant bypass valves to selectively direct at least one of the fuel through the one or more fuel bypass lines or the lubricant through the one or more lubricant bypass lines based on at least one of a fuel temperature of the fuel or a lubricant temperature of the lubricant.

17. The gas turbine engine of claim 16, wherein the controller controls the one or more fuel bypass valves to direct the fuel through the one or more fuel bypass lines if at least one of the fuel temperature is equal to or greater than a fuel temperature threshold or the lubricant temperature is less than a lubricant temperature threshold.

18. The gas turbine engine of claim 17, wherein the controller controls the one or more fuel bypass valves to direct the fuel through the fuel-lubricant heat exchanger if at least one of the fuel temperature is less than the fuel temperature threshold or the lubricant temperature is equal to or greater than the lubricant temperature threshold.

19. The gas turbine engine of claim 16, wherein the controller controls the one or more lubricant bypass valves to direct the lubricant through the fuel-lubricant heat exchanger if at least one of the lubricant temperature is equal to or greater than a lubricant temperature threshold or the fuel temperature is less than a fuel temperature threshold.

20. The gas turbine engine of claim 19, wherein the controller controls the one or more lubricant bypass valves to direct the lubricant through the one or more lubricant bypass lines if at least one of the lubricant temperature is less than the lubricant temperature threshold or the fuel temperature is equal to or greater than the fuel temperature threshold.

* * * * *